(12) United States Patent
Agrawal et al.

(10) Patent No.: US 12,028,645 B2
(45) Date of Patent: Jul. 2, 2024

(54) SUBJECT-BASED SMART SEGMENTATION OF VIDEO FEED ON A TRANSMITTING DEVICE

(71) Applicant: MOTOROLA MOBILITY LLC, Wilmington, DE (US)

(72) Inventors: Amit Kumar Agrawal, Bangalore (IN); Jeffrey S Vanhoof, Gurnee, IL (US); Bill Ryan, Libertyville, IL (US); Daniel M Vacura, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 13 days.

(21) Appl. No.: 17/826,784

(22) Filed: May 27, 2022

(65) Prior Publication Data

US 2023/0388447 A1 Nov. 30, 2023

(51) Int. Cl.
*H04N 5/45* (2011.01)
*G06F 3/04847* (2022.01)
*G06F 3/0488* (2022.01)
*G06T 7/11* (2017.01)
*H04N 7/14* (2006.01)

(52) U.S. Cl.
CPC .......... *H04N 5/45* (2013.01); *G06F 3/04847* (2013.01); *G06F 3/0488* (2013.01); *G06T 7/11* (2017.01); *H04N 7/147* (2013.01); *G06T 2207/10016* (2013.01)

(58) Field of Classification Search
CPC . H04N 7/15; H04N 7/147; H04N 5/45; H04L 65/403; G06F 3/04847; G06F 3/0488; G06F 3/017; G06F 3/04886; G06F 1/1694; G06T 7/11; G06T 2207/10016

USPC ............................................ 348/14.01–14.16
See application file for complete search history.

(56) References Cited

U.S. PATENT DOCUMENTS

| 10,180,775 B2 | 1/2019 | Laska et al. |
| 11,291,920 B2 | 4/2022 | Thompson et al. |
| 11,539,919 B1 * | 12/2022 | Rao ..................... H04N 5/2624 |
| 11,641,514 B1 | 5/2023 | Desai et al. |

(Continued)

OTHER PUBLICATIONS

Notice of Allowance dated Jun. 13, 2023, issued in related U.S. Appl. No. 17/826,825 (9 pages).

*Primary Examiner* — Phung-Hoang J Nguyen
(74) *Attorney, Agent, or Firm* — Isidore PLLC

(57) ABSTRACT

A communication device provides subject-based segmentation and selective presentation of a video feed. A processor identifies a primary subject and a secondary subject within a captured video stream. The processor delineates the video stream into a primary segment and at least one secondary segment respectively encompassing the primary and secondary subjects. The processor identifies for each connected second device, a request type from among: (i) a first request type to only receive the primary segment; (ii) a second request type to receive the primary segment and secondary segment(s); and (iii) a third request type to receive secondary segments, but not the primary segment. The processor transmits, to each second device, specific segments of the video feed based on the request type associated with each respective second device. An accessibility setting enables a second device to selectively receive video segments of a sign language interpreter along with a main presenter.

20 Claims, 13 Drawing Sheets

(56) References Cited

U.S. PATENT DOCUMENTS

| | | | |
|---|---|---|---|
| 2006/0092269 A1* | 5/2006 | Baird | H04N 21/4622 |
| | | | 348/E7.083 |
| 2006/0259552 A1* | 11/2006 | Mock | H04N 7/147 |
| | | | 709/204 |
| 2014/0365889 A1* | 12/2014 | Lipman | H04L 65/403 |
| | | | 715/753 |
| 2018/0176508 A1* | 6/2018 | Pell | H04L 65/403 |
| 2022/0215924 A1 | 7/2022 | Miller | |
| 2022/0335720 A1 | 10/2022 | Chang et al. | |
| 2022/0343621 A1 | 10/2022 | Marcuccio et al. | |

\* cited by examiner

SUBJECT-BASED SMART SEGMENTATION OF VIDEO FEED ON A TRANSMITTING DEVICE

CROSS-REFERENCE TO RELATED APPLICATIONS

This application is related to application Ser. No. 17/826,825, filed on an even date herewith, the contents of which is fully incorporated herein by reference.

BACKGROUND

1. Technical Field

The present disclosure generally relates to electronic devices that capture video provided to a video communication session, and more specifically to electronic devices capturing and transmitting captured video with multiple subjects to a video communication session.

2. Description of the Related Art

Modern smartphones are equipped with some of the best digital cameras in the consumer market. Smartphones are often utilized to enable video communication sessions with a second device, where the front camera is used to focus on the user while the display presents the video received from the second device. However, given the limitations in screen size, persons engaged in video communication sessions, such as a video conference, often prefer to use their laptops or desktop devices that present a much larger display for previewing the received video within the communication application interface that can also present one of more communication application settings icons/menu items.

Because of the low quality of the video images captured by the traditional built-in or USB-wired webcams, recent solutions have been provided for smartphone users to utilize the better-quality cameras available with their smartphones to capture the video that is transmitted as the video feed in video communication sessions with other devices. The smartphones are wired or wirelessly connected to the PC or display, which provides a larger display screen for video review and viewing. In conventional video capture with these smartphones, the entire field of view (FOV) of the phones image capturing device is captured and shared as a video feed that is transmitted to the receiving devices engaged in the video communication session. These receiving devices then presents the entire FOV content on the remote participants receiving device, including sections of the FOV the local participant may not necessarily want to share with the other participants.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
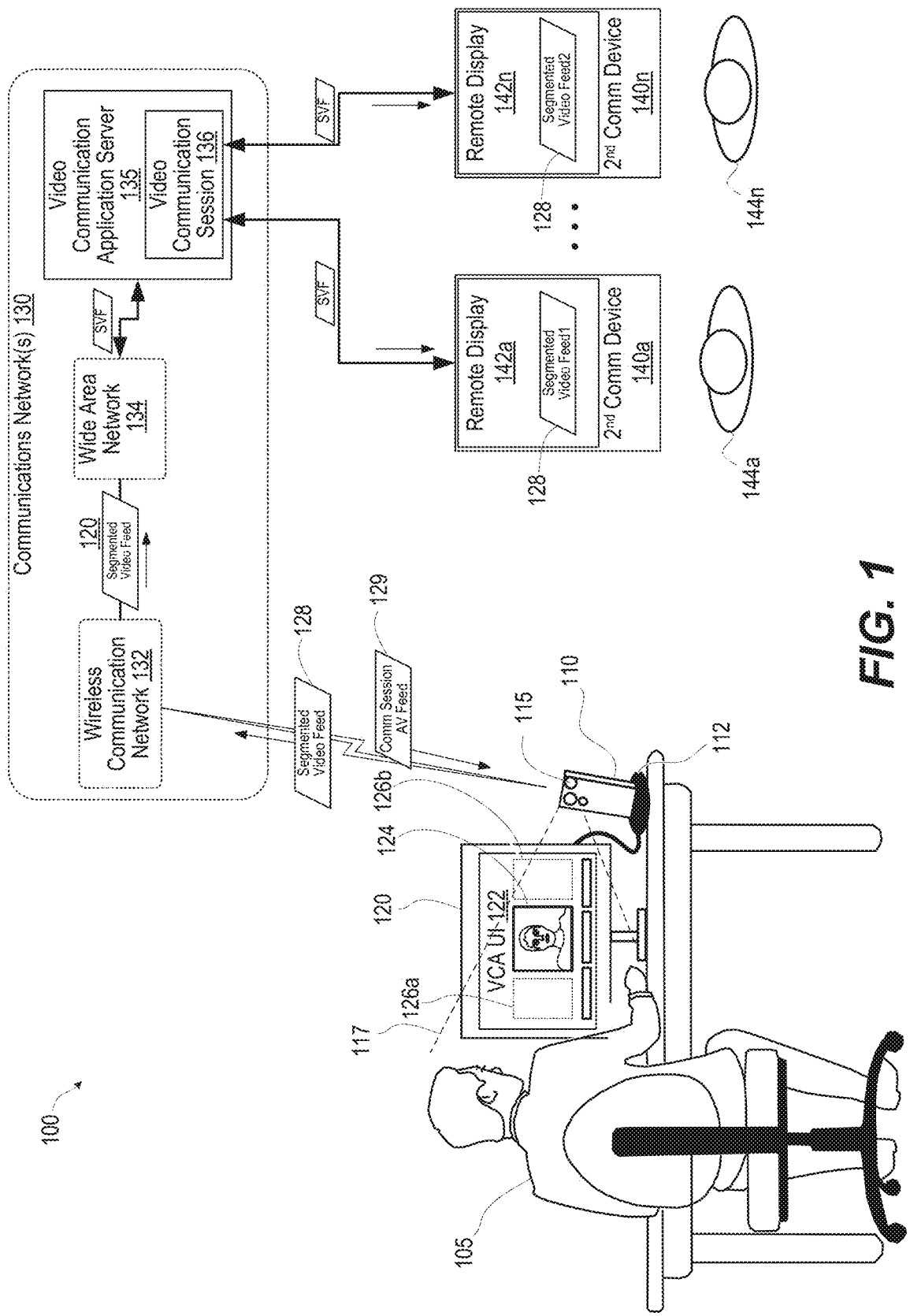
FIG. 1 illustrates an example video communication session environment having a communication device exchanging a segmented video feed with at least one second electronic device via a video presentation session, according to one or more embodiments.

According to one aspect of the disclosure, a communication device, a method, and a computer program product provides segmenting of a video image into primary and secondary segments. In one embodiment, the communication device includes at least one image capturing device that captures video images of a scene, an interface by which the communication device to communicatively connect and transmit a video feed to a plurality of second devices during a video presentation session. The communication device includes a memory having stored thereon a subject-based video image segmentation and presentation module (S-VISPM) that provides program instructions for spatially delineating video images of a captured video into two or more segments that can be individually presented within or removed from the video feed being transmitted via the video presentation session. The communication device includes at least one processor communicatively coupled to the display device, to the communication interface, to each of the at least one image capturing device, and to the memory.

The at least one processor executes the program instructions of the S-VISPM, which configures the processor to identify at least two subjects within a video stream that is captured via the at least one image capturing device, each subject of the at least two subjects spatially separated from each other within the scene captured within the video stream, a first subject being a primary subject and a second subject being a secondary subject. The processor delineates the scene captured in the video stream into a plurality of segments, based on respective locations of the primary subject and the secondary subject, including a primary segment that encompasses the primary subject and at least one secondary segment that encompasses a respective secondary subject. The processor identifies for each of the plurality of second devices, a request type from among (i) a first request type identifying that a corresponding second device should only receive the primary segment; (ii) a second request type identifying that the corresponding second device is to receive the primary segment and at least one of the secondary segments; and (iii) a third request type identifying that the corresponding second device is to receive one or more of the at least one secondary segments, but not the primary segment. The processor transmits, via the video presentation session to each second device with the first setting, a first video feed that comprises only the primary segment presenting only the primary subject. And, the processor transmits, via the video presentation session to each second device with the second setting, a second video feed comprising both the primary segment and at least one of the secondary segments, respectively presenting the primary subject and the secondary subject. The communication device is an image streaming device from which the video feed originates and is being transmitted via the video presentation session to the second devices.

According to another aspect of the disclosure, the second device is a video receiving device communicatively coupled to the video presentation session. The second device can be similarly configured as the above-introduced communication device. In addition to the display device, the second device includes a communication interface that enables the electronic device to communicatively connect to at least one image stream transmitting (IST) device during a video presentation session. The second device has a memory having stored thereon a video image segmentation and selection module (VISSM) with program instructions for segmenting and selectively displaying of one or more segments of a received video feed based on user preferences. The at least one processor processes the program instructions of the VISSM, which configures the processor to receive, via the communication interface, the video feed from the video presentation session and determine that the video feed is a subject-based segmented video feed, which includes multiple segments that can be individually selected for local presentation on the display device. The multiple segments include a primary segment within which a primary subject is presented and at least one secondary segment having at least one secondary subject. The processor determines a user preference for local viewing options of the video presentation session, from among (i) a first preference that the video feed should include respective segments presenting the primary subject and at least one secondary subject; and (ii) a second preference that the video feed should include only the primary segment with the primary subject; and (iii) a third preference that the video feed should include one or more of the at least one secondary segments, but not the primary segment. The processor provides a resulting video feed on the display device, presenting only content of specific segments of the received video feed that correspond to the user preference.

As a background to the above-described aspects, and according to one embodiment, a communication device includes at least one image capturing device that captures video of a local scene and an interface by which the electronic device connects to a display device. The electronic device also includes a memory having stored thereon a video image segmentation and control module (VISCM) that provides program instructions for spatially delineating video images into two or more segments that can be individually presented within or excluded from a video preview and/or video feed. The electronic device also includes at least one processor communicatively coupled to the display device, to each of the at least one image capturing device, and to the memory. The at least one processor executes the program instructions of the VISCM, which causes the at least one processor to identify a primary region of interest (ROI) within a video image captured by the at least one image capturing device, the primary region of interest being a smaller area than the video image. The at least one processor delineates the video image into two or more segments, including a primary segment that encompasses the primary ROI and at least a secondary segment. The at least one processor then associates a touchless action center with a virtual interface with a location of the secondary segment in the video image. The virtual interface includes at least one feature that can be selected via one of air gestures and screen touches during presentation of the primary segment of the video image. The at least one processor then presents a preview of the delineated segments of the video image on the display device with at least the primary segment and the secondary segment of the video image and the virtual interface being visible within the display device.

Each of the described features and functions of the various different aspects, which are presented as operations performed by the processor(s) of electronic devices are also described as features and functions provided by a plurality of corresponding methods and computer program products, within the various different embodiments presented herein. In the embodiments presented as computer program products, the computer program product includes a non-transitory computer readable storage device having stored thereon program instructions or code that, when processed by at least one processor of an electronic device, such as described above, enables the electronic device to complete the functionality of a respective one of the above-described processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

One motivation for implementation of the subject-based segmenting of a video feed/image and granular transmission of selected segments to the receiving second devices is the recognition that not every recipient of a video having multiple subjects want to have to view all of the subjects, particularly when one subject is a primary subject and the secondary subjects are not of interest to the watching participant. The disclosure provides AI driven enhancements to video presentations applications that utilize a smartphone to capture the video of the local scene (with multiple subjects) that going to be transmitted as a video feed to the remote participants of the video communication session.

As utilized herein, the term "subject" generally refers to a person who occupies a space in the video image that can be separated out from other people present in the video image. Using AI, the communication devices are able to discern which person among a plurality of presented persons is a primary subject, a main actor, a main presenter, or a most important face to present to the receiving second devices on a presentation session. In different implementations, the subject can refer to a non-human entity or animal. For example, a subject may be a dog that is differentiated in the captured image from other dogs and or other animals in the same video image.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 110 (FIGS. 2A-2B) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example video communication session (VCS) environment 100 having a communication device 110 exchanging a segmented video feed 128 via the communication session 136 with at least one second electronic device 120A-120N, according to one or more embodiments. Communication device 110 is an electronic device that (i) supports video communication with other devices, includes one or more image capturing devices/sensors (i.e., cameras), and which provides the capability of being utilized as a web camera during the video communication session. In one or more embodiments, communication device 110 is a mobile phone and/or incorporates the features of a mobile phone. According to one or more embodiment, communication device 110 can be interchangeably referred to as image stream transmitting (IST) device. Communication device 110 is also interchangeably referred to as communication device 110 to distinguish from second communication devices 140a-140n. For simplicity in describing certain features of the disclosure, where second communication devices 140*a*-140*n* are individually referenced as different communication devices, second communication devices 140*a*-140*n* can be individually presented as second communication device 140*a* and third communication device 140*n*.

Returning to FIG. 1, VCS environment 100 includes a local participant 105 who communicatively connects to a video communication session 136 using mobile communication device 110 that is wired or wirelessly connected to display device 120. Display device 120, which can also be referred to as a display device, is a local display device. The displays associated with the second communication devices 140*a*-140*n* are referred to as second displays or remote displays. Display device 120 is also external to communication device 110 and can thus be referred to as external display device 120. Communication device 110 is positioned on a desk proximate to local participant 105. In the described embodiments, communication device 110 is a smartphone held by docking dongle 112 and includes several (i.e., at least one) image capturing sensors/device (ICD) 115. Docking dongle 112 provides a wired USB connection to large display device 120 on which video images captured by ICD 115 and video feeds (129) received from video communication session 136 can be displayed for viewing by local participant 105. ICD 115 captures a field of view (FOV) (illustrated by the dashed lines and generally presented as FOV 117) of local space including the local participant 105. ICD 115 generates video images that are presented within a video communication application (VCA) user interface 122 on display device 120 for preview by local participant 105. According to one aspect of the disclosure, communication device 110 segments the locally captured video images to provide a primary segment 124 that includes the region of interest (ROI), which is typically a face and upper torso of local participant 105. Additionally secondary segments then provide the remaining content captured within the local scene. According to one aspect of the disclosure, local preview on display device 120 can also provide additional virtual control areas 126*a*, 126*b*, with virtual interfaces which occupy or overlay segments of the original video image that are not within the primary segment.

Communication device 110 transmits segmented video feed 128 comprised of at least the primary segment through communications network 130, which includes wireless communication network 132 and associated physical networking components and wide area network 134 and associated physical networking components. Wide area network 134 provides or supports connection by video communication application (VCA) server(s) 135, which is one or more physical components or logical partitions within servers that process server-level functions for video communication session 136. Segmented video feed 128 is forwarded by video communication application server(s) 135 to each session-connected second communication device 140*a*-140*n*, which presents segmented video feed 128 on respective remote display devices 142*a*-142*n* for viewing by their respective remote participants 144*a*-144*n*.

It is appreciated that the term segmented video feed can mean different things within the context of the various different aspects of the disclosure. The received video feed is a complete video feed that appears seamless to the remote participants 144*a*-144*n* but can comprise only one of (or less than a full completement of) multiple segments into which the original video stream captured at the local ICD 115 is divided/delineated.

Figure 2A:
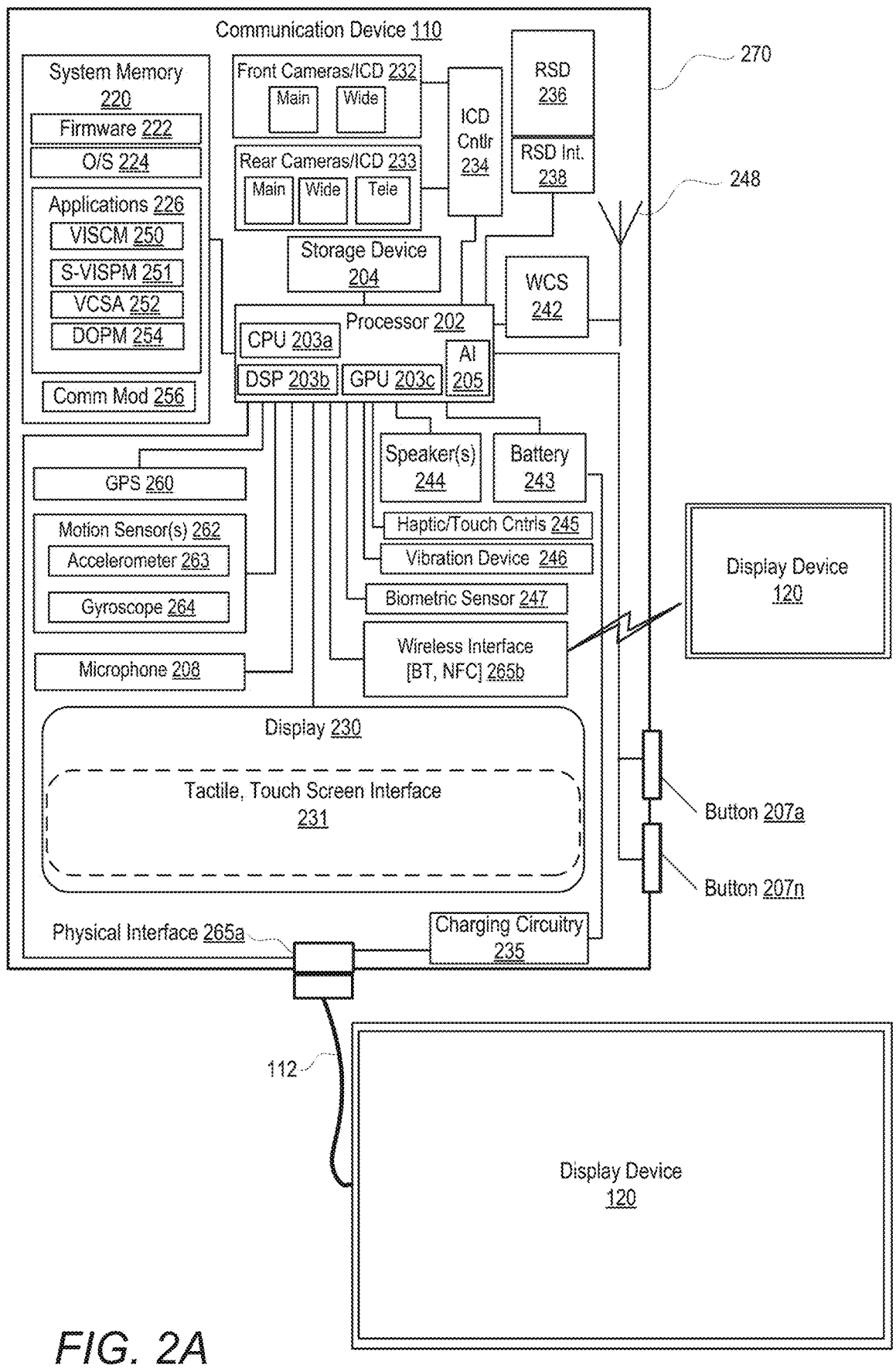
FIG. 2A depicts an example communication device with an attached external display and within which various aspects of the disclosure can be implemented, according to one or more embodiments.

Turning now to FIG. 2A, there is depicted an example communication device 110 within which various aspects of the disclosure can be implemented, according to one or more embodiments. Examples of such communication devices include, but are not limited to, mobile devices, a notebook computer, a mobile phone, a smart phone, a digital camera with enhanced processing capabilities, a smart watch equipped with an ICD and enhanced processing, a tablet computer, and other types of communication device that incudes or can be directly tethered to an ICD. It is appreciated that communication device 110 can be other types of electronic devices that include at least one front facing camera or one rear facing camera and which supports both video and non-video communication with one or more second communication devices.

Communication device 110 includes processor 202 (or processor integrated circuit (IC) chip), which includes processor resources such as central processing unit (CPU) 203*a*, communication signal processing resources such as digital signal processor (DSP) 203*b*, and graphics processing unit (GPU) 203*c*. Processor 202 can, in some embodiments, include high quality camera image signal processors (ISPs) (not shown) and dedicated artificial intelligence (AI) engines 205. Collectively, processor 202 supports computing, classifying, processing, transmitting and receiving of data and information, and presenting of graphical images within a display. Processor 202 is communicatively coupled to storage device 204, system memory 220, input devices, introduced below, output devices, including integrated display 230, and image capture device (ICD) controller 234. According to one or more embodiments, ICD controller 234 performs or supports functions such as, but not limited to, selecting and activating an active camera from among multiple cameras, adjusting the camera settings and characteristics (e.g., shutter speed, f/stop, ISO exposure, zoom control, etc.) of the active camera, etc. ICD controller 234 can perform these functions in response to commands received from processor 202, which processes instructions of camera control module (296, FIG. 2B) to cause one or more of ICDs 232, 233 to capture video images of a local scene within a FOV (117) of the operating ICD. In one or more embodiments, the functionality of ICD controller 234 is incorporated within processor 202, eliminating the need for a separate ICD controller.

For simplicity in describing the features presented herein, the various camera selection, activation, and configuration functions performed by the ICD controller 234 are described as being provided generally by processor 202. Similarly, manipulation of captured images and videos are typically performed by GPU 203*c*, and certain aspects of device communication via wireless networks are performed by DSP 203*b* with support from CPU 203*a*. However, for simplicity in describing the features of the disclosure, the functionality provided by one or more of CPU 203*a*, DSP 203*b*, and GPU 203*c* are collectively described as being performed by processor 202.

Throughout the disclosure, the term image capturing device (ICD) is utilized interchangeably to be synonymous with and/or refer to any one of front or rear facing cameras 232, 233. Front facing cameras 232 and rear facing cameras 233 are communicatively coupled to ICD controller 234, which is communicatively coupled to processor 202. Both sets of ICDs 232, 233 includes image sensors that can capture images that are within the field of view (FOV) of respective ICD 232, 233. Communication device 110 can includes multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lends to allow for wide angle and telephoto image capture.

System memory 220 may be a combination of volatile and non-volatile memory, such as random access memory (RAM) and read-only memory (ROM). System memory 220 can store program code or similar data associated with firmware 222, an operating system 224, and/or applications 226. During device operation, processor 202 loads and executes/processes program code of the various applications, modules, OS and firmware, that are stored in system memory 220.

In accordance with one or more embodiments, applications 226 include, without limitation, video image segmentation and control module (VISCM) 250, video communication session application (VCSA) 252, demonstration object preview module (DOPM) 254, and communication module 256. As the names suggest, each module and/or application (250-256) provides program instructions that are processed by processor 202 to cause processor 202 and/or other components of communication device 110 to perform specific operations, as described herein. Specifically, VCSA 252 and communication module 256 include program instructions that supports communication device 110 establishing a communication session with other external devices and systems, such as VCA server 135 and second communication devices 140a-140n. VISCM includes program instructions the support processor 202 delineating parts of a video feed into segments that can be separately presented and/or transmitted and instructions that support processor 202 presenting the touchless action centers with virtual interfaces and functionality associated therewith.

In one or more embodiments, communication device 110 includes removable storage device (RSD) 236, which is inserted into RSD interface 238 that is communicatively coupled via system interlink to processor 202. In one or more embodiments, RSD 236 is a non-transitory computer program product or computer readable storage device. RSD 236 may have a version of one or more of the applications (250, 252, 254) stored thereon. Processor 202 can access RSD 236 to provision communication device 110 with program code that, when executed/processed by processor 202, the program code causes or configures processor 202 and/or generally communication device 110, to provide the various different functionality described herein.

Communication device 110 includes an integrated display 230 which incorporates a tactile, touch screen interface 231 that can receive user tactile/touch input. As a touch screen device, integrated display 230 allows a user to provide input to or to control communication device 110 by touching features presented within/below the display screen. Tactile, touch screen interface 231 can be utilized as an input device. In some implementations, integrated display 230 is integrated into a front surface of communication device 110, while the higher quality ICDs are located on a rear surface. Communication device 110 is placed in an orientation with the higher quality ICDs facing the scene being captured and integrated display located away from the subject of interest.

As one aspect of the disclosure, communication device 110 also includes external display device 120, which is communicatively coupled to communication device 110 via a physical interface 265a or a wireless interface 265b. Display device 120 can be one of a wide variety of display screens or devices, such as a liquid crystal display (LCD) and an organic light emitting diode (OLED) display.

Wireless interface 265b can be a short-range wireless communication device providing Bluetooth, near field communication (NFC) and/or a wireless fidelity (Wi-Fi) connections. In one embodiment, communication device 110 can receive internet or Wi-Fi based calls via wireless interface 265b. In one embodiment, communication device 110 can communicate wirelessly with externally provided WiFi router via wireless interface 265b. In an embodiment, WCS 242, antenna(s) 248 and wireless interface 265b collectively provide communication interface(s) of communication device 110. These communication interfaces enable communication device 110 to communicatively connect to at least one second communication device 140 (FIG. 1) via at least one network.

Physical interface 265a of communication device 110 can serve as a data port and can be coupled to charging circuitry 235 and device battery 243 to enable recharging of device battery 243. Enabling the audio communication aspects for video communication session, communication device 110 further includes microphone 208, one or more output devices such as speakers 244, and one or more input buttons 207a-207n. Input buttons 207a-207n may provide controls for volume, power, and ICDs 232, 233. Microphone 208 can also be referred to as an audio input device. Microphone 208 and input buttons 207a-207n can also be referred to generally as input devices.

Communication device 110 further includes wireless network communication subsystem (WCS) 242, which can represent one or more front end devices (not shown) that each coupled to one or more antennas 248. In one or more embodiments, WCS 242 can include a communication module with one or more baseband processors or digital signal processors, one or more modems, and a radio frequency (RF) front end having one or more transmitters and one or more receivers. WCS 242 and antennas 248 allow communication device 110 to communicate wirelessly with a wireless communication network 132 (FIG. 1) via transmissions of communication signals to and from network communication devices, such as base stations or cellular nodes, of wireless communication network 132.

Wireless communication network 132 further allows communication device 110 to wirelessly communicate with second communication devices 140a-140n, which can be similarly connected to wireless communication network 132. Communication device 110 can also communicate wirelessly with wireless communication network 132 via communication signals transmitted by short range communication device(s) to and from an external WiFi router, which is communicatively connected to wireless communication network 132. In one or more embodiment, wireless communication network 132 can include one or more servers (e.g., VCA server 135) that support exchange of wireless data and video and other communication between communication device 110 and second communication device 140a-140n.

Communication device 110 further includes haptic touch controls 245, vibration device 246, fingerprint/biometric sensor 247, global positioning system (GPS) device 260, and motion sensor(s) 262. Vibration device 246 can cause communication device 110 to vibrate or shake when activated. Vibration device 246 can be activated during an incoming call or message in order to provide an alert or notification to a user of communication device 110. In one or more embodiments, vibration device 246 can be used to inform the user when delineation and separation of the segments of a video image occurs and/or when a gesture is detected and accepted. According to one aspect of the disclosure, integrated display 230, speakers 244, and vibration device 246 can generally and collectively be referred to as output devices.

Biometric sensor 247 can be used to provide biometric data, such as fingerprints, to identify or authenticate a user. GPS device 260 can provide time data and location data about the physical location of communication device 110 using geospatial input received from GPS satellites.

Motion sensor(s) 262 can include one or more accelerometers 263 and gyroscope 264. Motion sensor(s) 262 can detect movement of communication device 110 and provide motion data to processor 202 indicating the spatial orientation and movement of communication device 110. Accelerometers 263 measure linear acceleration of movement of communication device 110 in multiple axes (X, Y and Z). For example, accelerometers 263 can include three accelerometers, where one accelerometer measures linear acceleration in the X axis, one accelerometer measures linear acceleration in the Y axis, and one accelerometer measures linear acceleration in the Z axis. Gyroscope 264 measures rotation or angular rotational velocity of communication device 110. In one or more embodiments, the measurements of these various sensors can also be utilized by processor 202 in the determining of the context of a communication. Communication device 110 further includes housing that contains/protects the components internal to communication device 110.

Figure 2B:
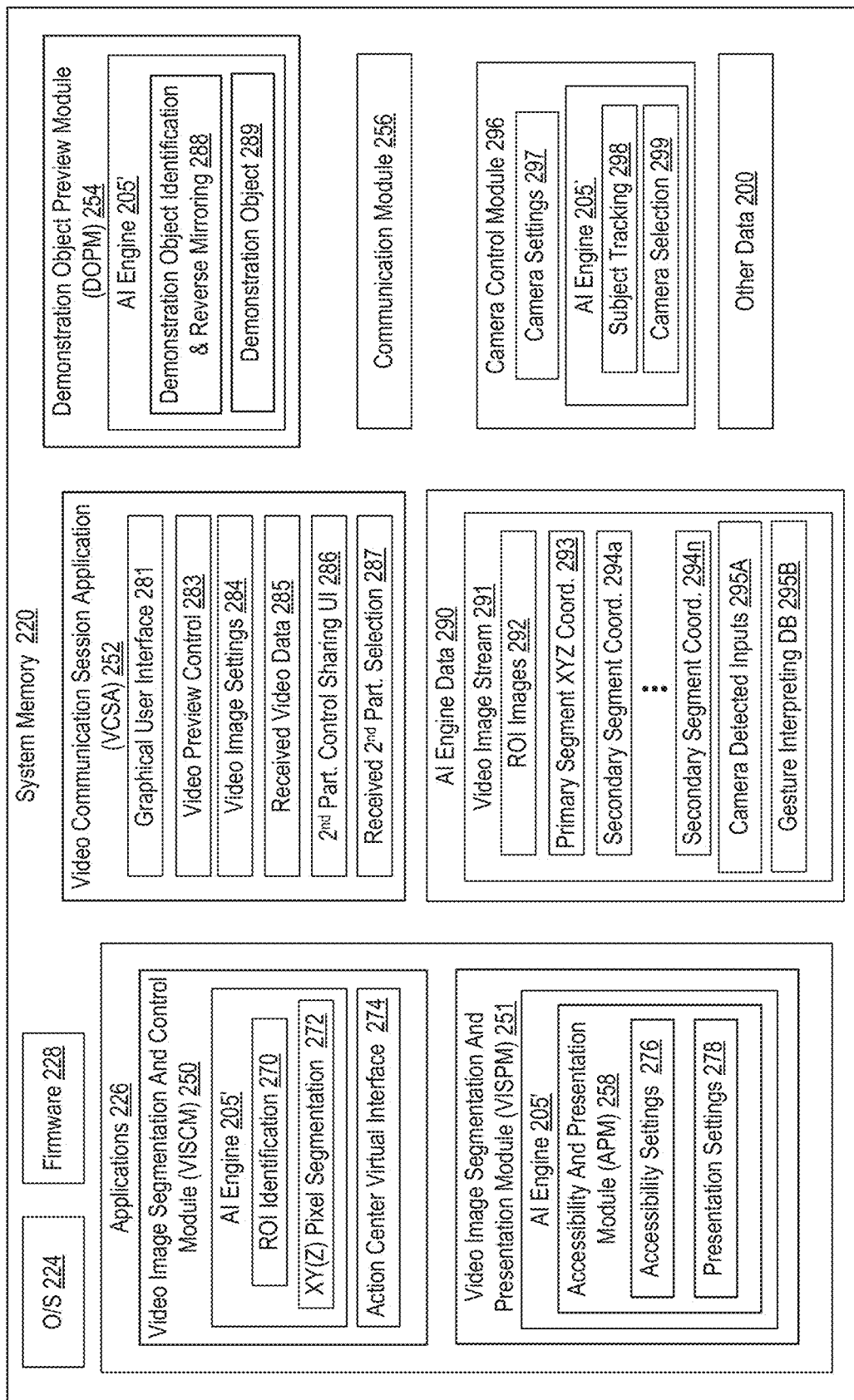
FIG. 2B is a block diagram of example contents of the system memory of the example communication device of FIG. 2A, according to one or more embodiments.

Referring to FIG. 2B, there is shown one embodiment of example contents of system memory 220 of communication device 110. As generally introduced within FIG. 2A, system memory 220 includes data, software, and/or firmware modules, including applications 226, operating system 224, firmware 228, and communication module 256. Applications generally include VISCM 250, VISPM 251, VCSA 252, DOPM 254, and camera control module (CCM) 296.

Each of the various modules and applications includes program instructions/code that is processed by processor 202 and in some instances AI engine 205 to configure communication device 110 to perform the various different features of the present disclosure. In one or more embodiments, several of the modules include a representation of AI engine 205', which can further include a machine learning (ML) engine (not separately shown) and computer vision (CV) engine (not separately shown). AI engine 205' enables communication device 110 to identify a region of interest (ROI) within a locally captured video stream, identify subjects within the video stream and determine primary subjects from secondary and accessibility subjects, track one or more subjects within a video stream, identify gesture provided inputs and associate the inputs with appropriate functions provide within virtual control interfaces, and identify text demonstration objects within a video stream, as well as other features and functions presented herein. In one or more embodiments, execution of the various modules by processor 202 enables/configures communication device 110 to perform the method processes presented in the various different flowcharts, as will be described below.

VISCM 250 and VISPM 251 include or utilize a local representation of AI engine 205' which provides the functions of ROI identification 270 and XY(Z) pixel segmentation 272. VISCM 250 also includes action center virtual interface module 274, which supports generation and presentation of action centers within or proximate to the displayed location of one or more of the secondary segments. As provided within AI engine data 290, AI engine 205' receives video image stream 291 and detects specific subjects, such as a human, that are to be represented within ROI images 292. Once ROI image 292 is detected within video image stream 291, AI engine 205' determines a primary segment having primary segment XYZ coordinates 293. Once the coordinates of the primary segment are identified and the primary segment delineated, AI engine 205' identifies secondary segment coordinates 294a-294n, which further delineate each of the secondary segments. AI engine 205' provides processor 202 with the required pixel coordinates for the primary segment and also for the side, secondary segments that can be utilized for presenting the action centers with virtual user interface functions.

In one embodiment, AI engine 205' also monitors video image stream 291 for images within the physical space proximate to the presented locations of the action center(s) on the display device. AI engine data 290 thus includes camera detected hand gestures/inputs 295A and gesture identifying/interpreting database 295B that can include various different gestures or hand/finger movements that correspond to a selection/activation of an action feature/function within the virtual interface. It is appreciated that one or more of the presented AI engine operations may be performed by other processor components.

VISPM 251 provides some of the segmentation features of VISCM 250 but also provides specific application of the segmentation of the video image based on subject detection within the image and subject classification. VISPM 251 includes AI engine 205 that processes accessibility and presentation module 258, which enables features related to accessibility settings 276 and presentation settings 278. These various modules perform the functions described with reference to the various figures which follow.

According to one feature of the disclosure, in response to detection of multiple potential subjects within a received video image, the processor identifies, via artificial intelligence (i.e., AI engine 205'), a primary subject from among the multiple potential subjects and aligns the primary segment with an ROI that incorporates the primary subject. The AI engine 205' also identifies secondary subjects within the video stream.

VCSA 252 includes graphical user interface 281 for the video communication application in which the video images are presented, video preview control functions 283, video image settings 284, received video data 285, remote second participant control sharing UI 286, and received second participant selections 287. The specific operations and/or functions associated with the remote second participant control sharing UI 286 and received second participant selections 287 will be explain in greater details later. Graphical user interface 281 includes a video presentation screen, a video preview screen, and a settings screen.

DOPM 254 includes AI engine 205', which provides the functions of demonstration object identification and reverse mirroring 288 to identify and manipulate demonstration object 289. According to one or more embodiments, and as illustrated and described herein, demonstration object 289 is a text-based demonstration object. However, it is appreciated that AI engine 205' can be similarly used to identify additional objects that may benefit from not being presented in its mirrored image. Additional details on the implementation of DOPM 254 will be provided later in the disclosure.

Communication module 256 enables communication device 110 to communicate with wireless communication network 132 and with other devices, such as second communication device 140, via one or more of audio, text, and video communications. Communication module 256 can support various communication sessions by communication device 110, such as audio communication sessions, video communication sessions, text communication sessions, communication device application communication sessions, or a dual/combined audio/text/video communication session.

CCM 296 includes camera parameters and settings 297, and AI engine 205, which further includes subject tracking 298 and camera selection modules 299. Other data 200 can also be provided within system memory, and the presented modules are for example only. Camera parameters and settings 297 can include fixed values such as focal length, maximum frame rate, and resolution and variable values such as light level values, directional values, and distances to objects within a camera FOV. Camera parameters and settings 297 are values and characteristics that can change during the operation of ICDs 232, 233 to capture images by the cameras. Camera parameters and settings 266 can include various settings such as aperture, shutter speed, iso level, white balance, zoom level, directional settings (i.e., region of interest (ROI)), distance settings, focus and others. In one embodiment, camera parameters and settings 266 can be determined by either processor 202 or by ICD controller 234 or AI engine 205. In one embodiment, camera parameters and settings 266 can be adjusted by the local participants use of gestures that are captured by the ICD and associated with one or more of the virtual interface functions within the currently displayed action center. Similarly, other characteristics of video images can be determined and/or modified, such as light levels within the ROI, contrast, blur, etc., can be adjusted by the local participants use of gestures that are captured by the ICD and associated with one or more of the virtual interface functions within the currently displayed action center.

Figure 3:
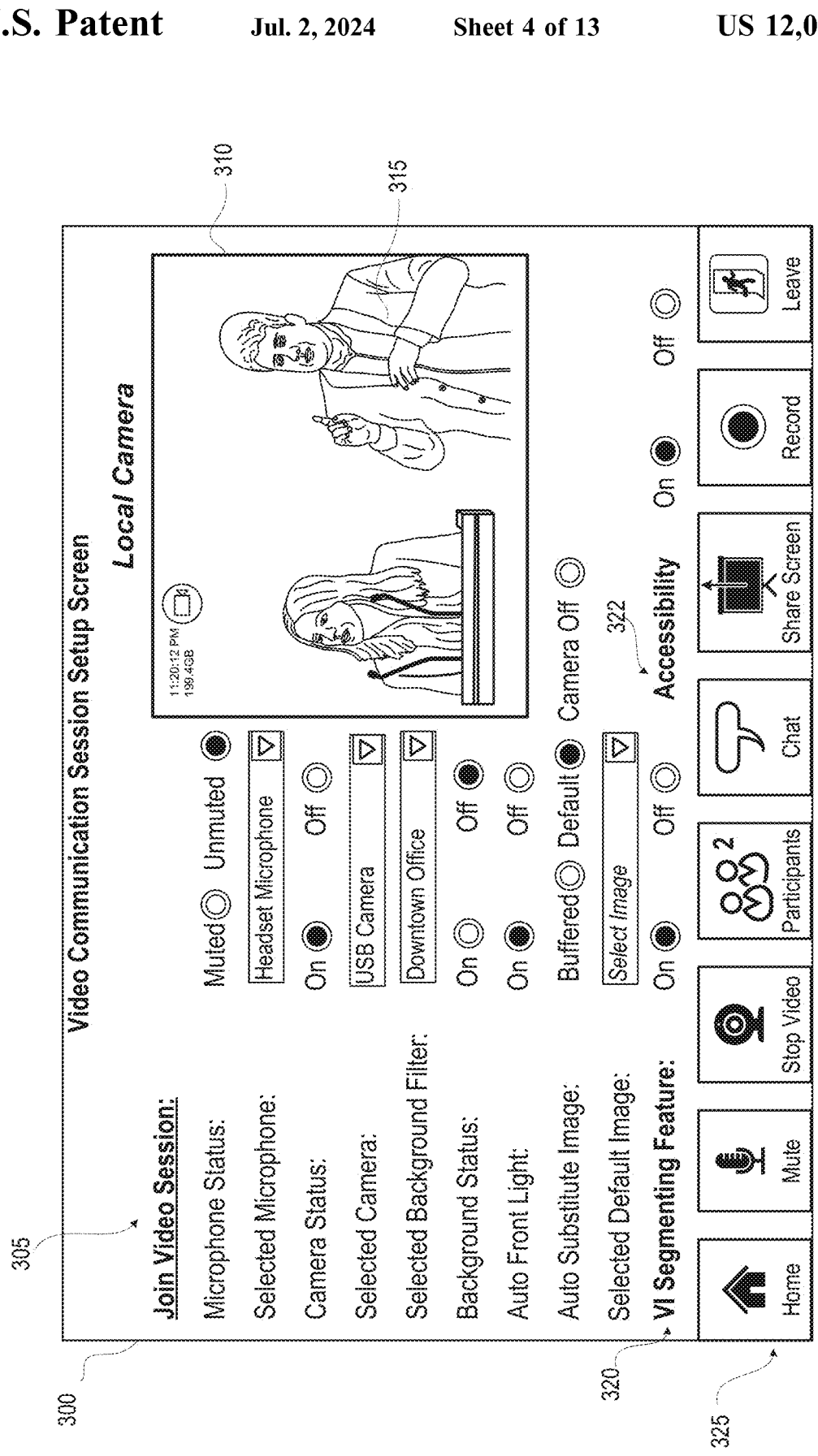
FIG. 3 depicts a settings user interface for a video communication/presentation application operating on the communication device and presenting user selectable options for activating local video segmenting and selective, subject-based segment sharing features of an artificial intelligence (AI) engine, in accordance with one or more embodiments.

FIG. 3 depicts a settings user interface for a video communication/presentation application operating on the communication device and presenting user selectable options for activating local video segmenting and selective, subject-based segment sharing features of an artificial intelligence (AI) engine, in accordance with one or more embodiments. Specifically, FIG. 3 presents an example settings screen 300 having a user interface 305 with a plurality of selectable options for the user to set up the video communications/presentation application on his/her device. Settings screen 300 includes a video image preview 310 which presents local participant 105 in a local scene 315 captured by one of the device's ICDs. Included within the selectable options is video image segmenting feature 320, which enables a user to activate (i.e., set to "on") the various functions provided by the different modules introduced above and described herein. Also included within the selectable options is accessibility on/off option 322, which enables the local user to activate the accessibility feature described herein. Settings screen 300 also presents integrated communication session control options 325 that are visible to the user and selectable during the video communication session.

In accordance with one aspect of the disclosure, and as illustrated by FIGS. 4A-4D (referenced herein and described in greater detail below) and FIGS. 6 and 7 (referenced herein and described in greater detail below), an electronic device 110 includes at least one ICD 232/233 that captures video (video stream 405) of a scene within a field of view (FOV) of the image capturing device 232/233. The electronic device 110 includes an interface 265 by which the electronic device connects to a local display device 120 and a communication interface (e.g., WCS 242) that enables the electronic device to communicatively connect and transmit a video feed (645, FIG. 6) to a plurality of second devices during a video presentation session. The electronic device 110 includes a memory 220 having stored thereon a subject-based video image segmentation and presentation module (S-VISPM or VISPM) 251 comprising program instructions for spatially delineating video images of a captured video into two or more segments, based on detected subjects, that can be individually presented within or removed from the video feed 645 being transmitted via the video presentation session 635. The electronic device 110 includes at least one processor 202 communicatively coupled to the display device 120, to the communication interface (242), to each of the at least one ICD 232/233, and to the memory 220.

With specific reference now to FIGS. 4A-4D, FIGS. 4A-4D provides a series of preview presentations on a display of the communication device 110 presenting captured video (405) of a local scene with one or both of the identified subjects presented, based on an accessibility setting, according to multiple embodiments. In the illustrative embodiment, the local scene within the captured video stream includes a sign language interpreter accompanying a main presenter and, with the main presenter considered a primary subject 410 and the sign language interpreter considered a secondary subject 412. The at least one processor 202 executes the program instructions of the S-VISPM 251, which configures the processor to identify at least two subjects (410, 412) within a video stream 405 that is captured via the at least one ICD 232/233. Each subject of the at least two subjects (410, 412) spatially separated from each other within the scene captured within the video stream 405, a first subject being a primary subject 410 and a second subject being a secondary subject 412. The processor 202 delineates the scene captured in the video stream 405 into a plurality of segments, based on respective locations of the primary subject and the secondary subject, including a primary segment 440 that encompasses the primary subject 410 and at least one secondary segment 445 that encompasses a respective secondary subject 412. In the illustrative embodiment, the main presenter is the primary subject 410 within the primary segment 440 and the interpreter is the secondary subject 412 within the secondary segment 445. According to the illustrative embodiment, Application user interface 400 includes selectable options for activating video image segmenting (VIS) feature 420 and Accessibility on/off feature 422. Selection of these options, indicated by the X placed in the selection boxes (420, 422) in FIGS. 4B and 4C, triggers/initiates the processes by which the AI engine 205 and/or processor 202 identifies the primary subject based on contextual data evaluated by artificial intelligence (AI) processing, determines a location of the primary subject within the scene, and determines, using the AI processing, the primary segment 440 based on the location of the primary object 410. The AI engine similarly determines the secondary segment 445 based on the location of the secondary subject 412.

Figure 4A:
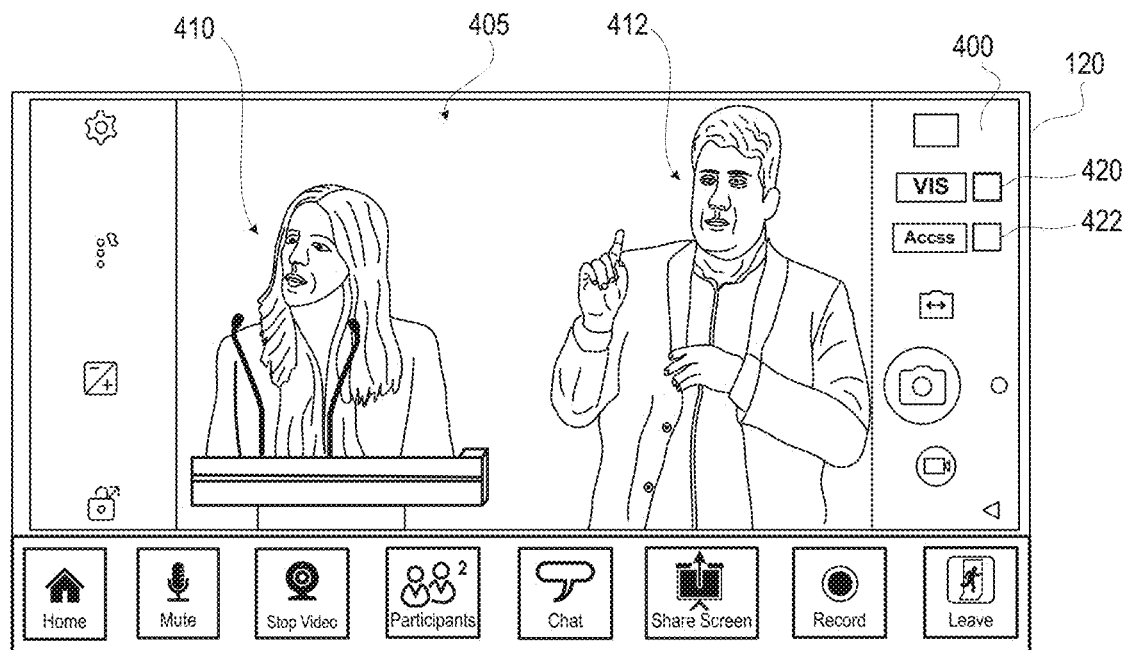
FIGS. 4A-4D provides a series of preview presentations on a display of the communication device presenting captured video of a local scene with one or both of the identified subjects presented, based on an accessibility setting, in accordance with multiple embodiments.
Figure 4B:
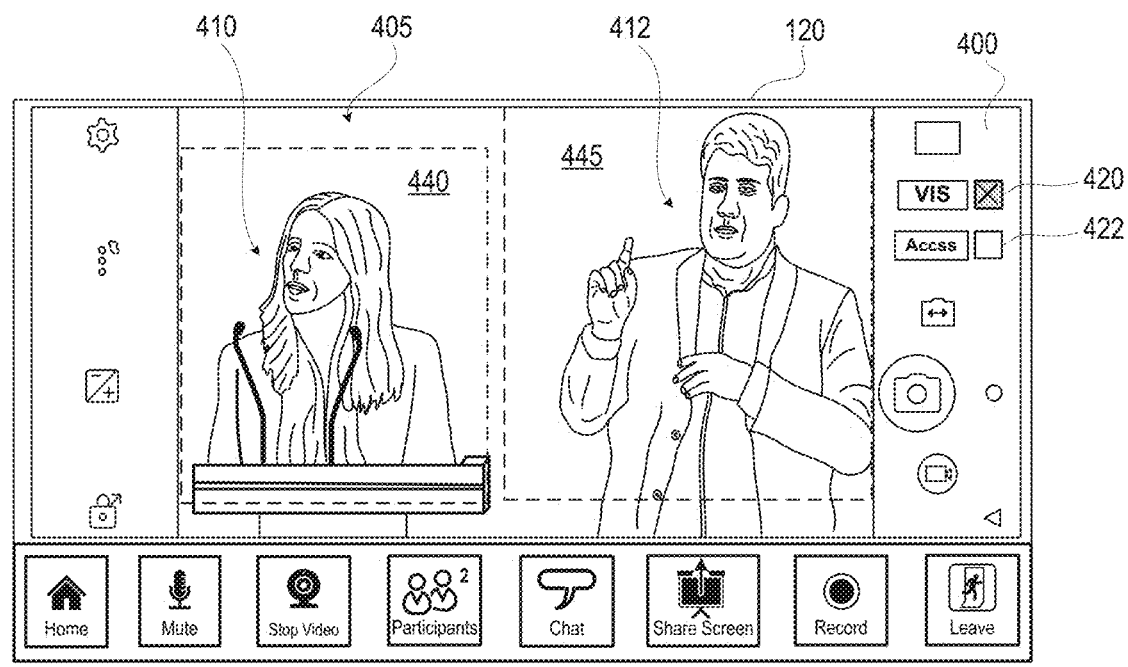
Figure 4C:
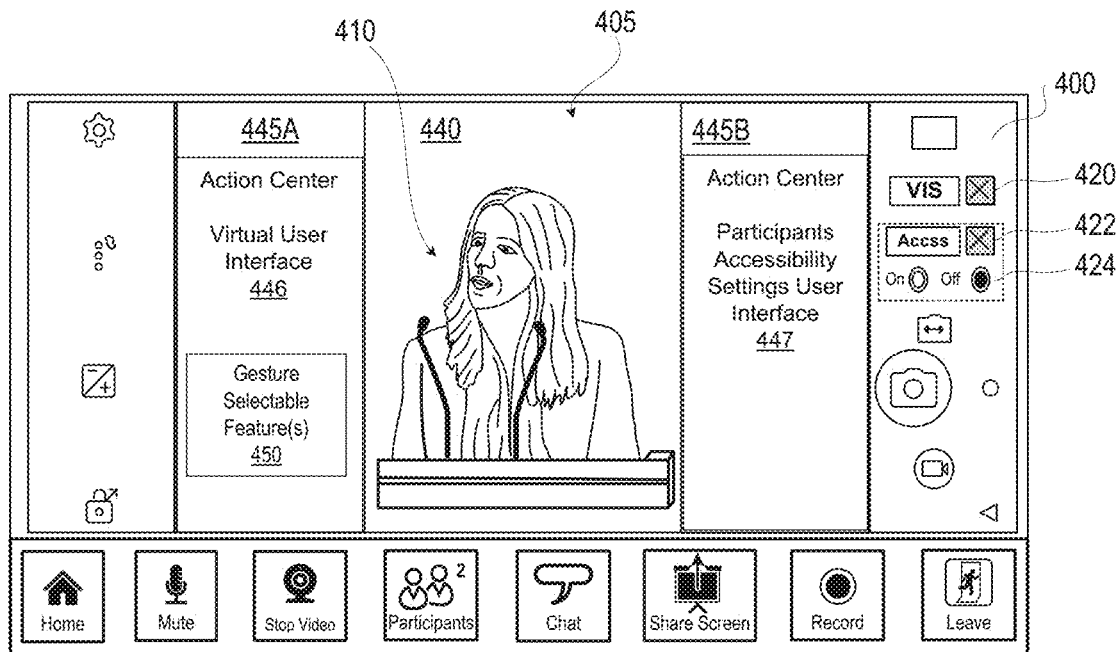
Figure 5:
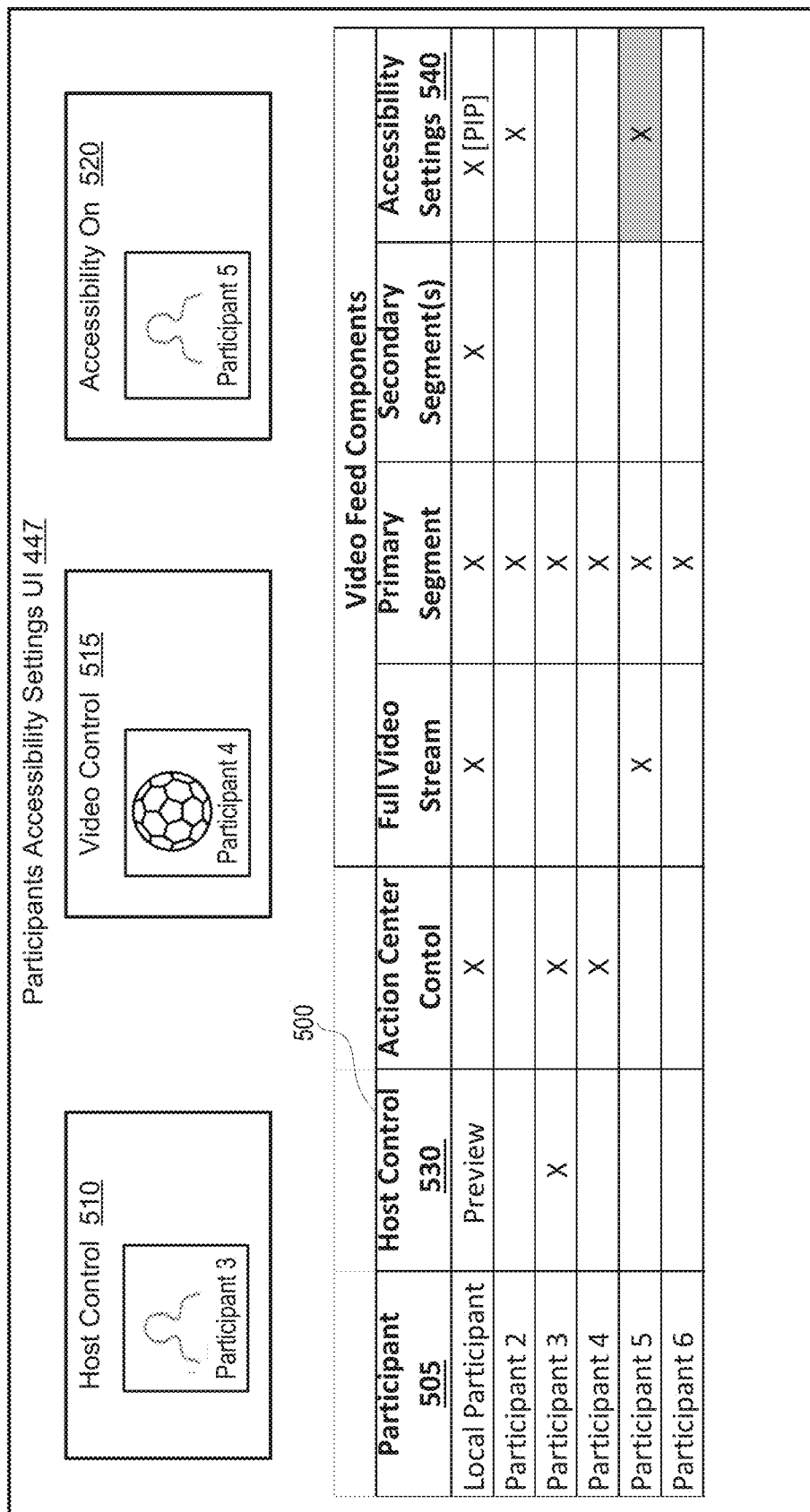
FIG. 5 illustrates an example selection table that is generated and presented on a display of a local participant to enable selection of an accessibility mode and present a listing of second participants on the video presentation session with individual accessibility settings that triggers which segment on the local video feed to present within the video feed to a respective, second participants, according to one or more embodiments.

As presented in FIG. 4B, one embodiment provides accessibility on/off selection buttons 424, such that the selection of the accessibility feature 422 results or causes the presentation of the options to turn the accessibility function on or off for the local view or preview of the image. In FIG. 4C, with local accessibility settings turned off for local preview, processor 202 presents only primary segment 440 centered on the display device 120. Thus, with the features turned off for local preview, the local presenter or a host monitoring the presentation session is presented with just the primary segment 440 flanked on both sides by secondary segments 445A, 445B in which are presented content for left and right action centers, respectively. The right action center (presented within secondary segment 445B) (as viewed on the page, located on the left side of main presenter) can provide a virtual user interface 446, which presenter can utilize to manipulate the video feed and or perform other functions or features available within the video presentation application via the virtual user interface. The left action center (presented within secondary segment 445A) can likewise provide a virtual user interface with selectable functions or features; However, in the presented embodiment, the left action center provides a participant accessibility settings user interface 447. FIG. 5 illustrates an example participant accessibility settings user interface 447 in which the participants accessibility settings as well as other settings are captured and stored within local system memory 220. In one embodiment, participant accessibility settings user interface 447 can present a listing 530 of the participants to the video presentation session and their respective accessibility setting 540.

In accordance with the described embodiments, the processor 202 delineates at least one periphery/second segment of the captured video image that does not contain a subject of interest and links a virtual control interface window (VCIW) (action center 436/437) with a location of one or more of the at least one secondary segment 445A, 445B. The VCIW includes at least one feature 450 that can be selected via one of air gestures and screen touches during presentation of the video feed to modify a setting of content within the video feed. The processor 202 overlays the at least one periphery secondary segment 445A, 445B with the VCIW, which supports selection via at least one of a touch input and a gesture input, and the processor 202 presents a preview of the capture video image with the VCIW presented within the preview on the display device 120.

Figure 4D:
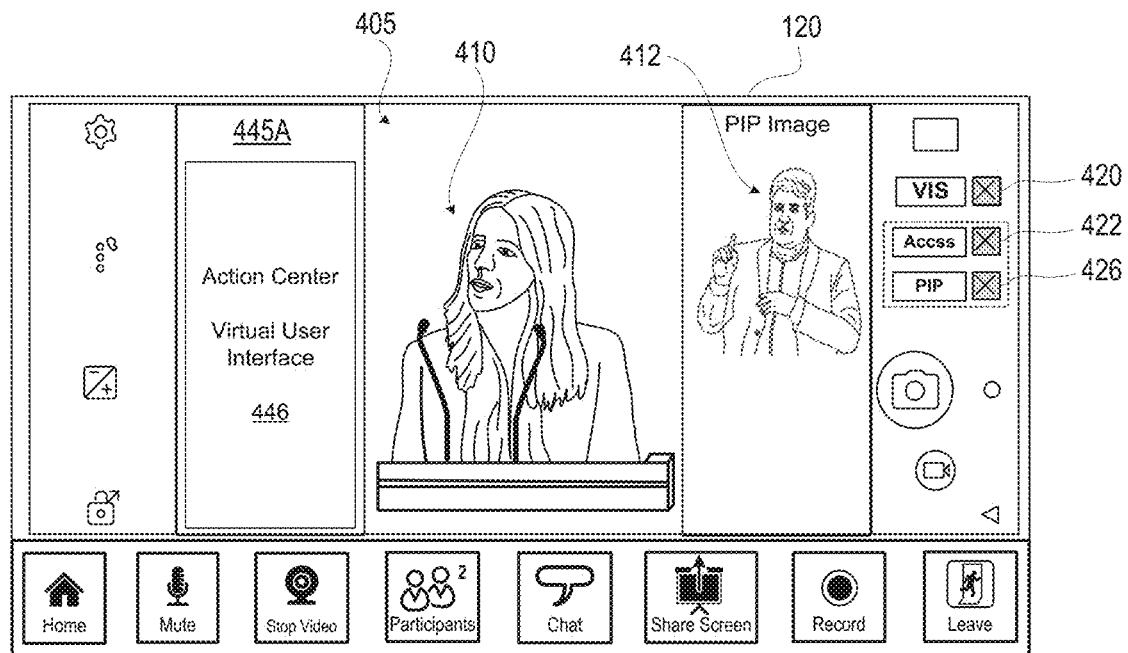

FIG. 4D presents another embodiment in which a picture-in-picture styled preview image is presented within one of the action centers. Specifically, PIP option 426 is presented as one of the selectable features within application user interface 400. Once PIP option 426 is selected, processor generates a preview of secondary subject 412 and presents the preview within one of the secondary segments 445A/445B, with the other second segment utilized to present the virtual user interface.

The processor 202 identifies, for each of the plurality of second devices that are connected to the video presentation session, a request type from among (i) a first request type identifying that a corresponding second device should only receive the primary segment, (ii) a second request type identifying that the corresponding second device is to receive the primary segment and at least one of the secondary segments, and (iii) a third request type identifying that the corresponding second device is to receive one or more of the at least one secondary segments, but not the primary segment. According to one embodiment, the processor 202 receives the request type from a second device 140, the request type identifying one of a subset of available segments of the segmented video feed and a complete video feed.

With reference now to FIG. 5, there is illustrated an example selection table that is generated and presented on a display of a local participant device to enable selection of an accessibility mode and present a listing of second participants on the video presentation session with individual accessibility settings that triggers which segment of the local video feed to present within the video feed to a respective, second participant, according to one or more embodiments. Participants Accessibility Settings UI 447 includes participants list 530 that includes a name or identification (ID) of each participant 505 connected to the video presentation session, and the accessibility settings 540 for those participants who have requested the accessibility features, such as presentation of the sign language interpreter (secondary subject 412). As shown, the list may also track which second devices are provided host privileges to receive action center control features along with the transmitted video feed from the communication device 110 that allow the second device 140 to manipulate or modify video content, etc., within the communication device 110. In one embodiment, only those participants that register to receive the accessibility options are recorded within the participants list for accessibility settings. Each participant that desires access to the accessibility feature transmits a request from their second electronic device 140 to the communication device 110. The request can include or indicate different types.

To generate the list 530 of FIG. 5, the processor 202 associates the received request type with the second device within a stored list 530 tracking connected second devices by their participant names or device names (e.g., participant 505). In one embodiment, participants with assigned features or function are highlighted or identified within the user interface (447) via participant identifying labels or icons within setting boxes for host control 510, video control 515, and accessibility on 520. In response to the request type identifying only a specific one or more segments from the segmented video feed, the processor 202 identifies which specific segments of the segmented video feed are to be transmitted to the second device 140 and transmits only the specific segments of the segmented video feeds to that second device. In response to the request type identifying a complete video feed, the processor 202 removes the delineation of the video stream and transmits an unsegmented version of the captured video stream as the video feed.

Figure 6:
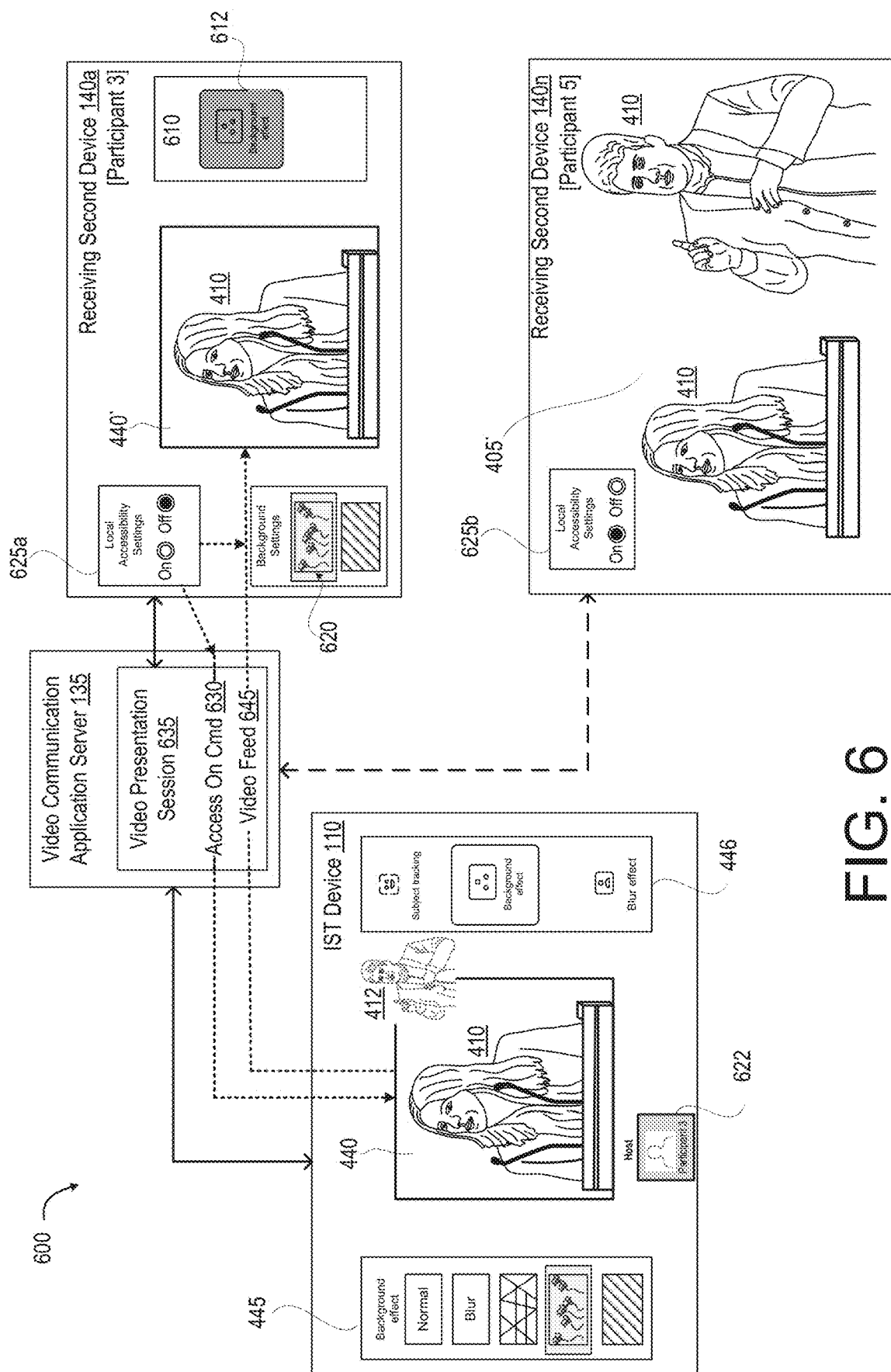
FIG. 6 illustrates a video presentation environment in which different segments of a video feed are transmitted by an IST device to different second devices based on an accessibility setting of the receiving second device, according to one or more embodiments.

In accordance with the specific embodiments presented in FIGS. 4A-4D, the processor 202 receives a request type from a second device 140 that receives the video feed via the video presentation session 635 (FIG. 6). FIG. 6 illustrates a video presentation environment 600 in which different segments of a video feed are transmitted by an IST device to different second devices based on an accessibility setting of the receiving second device, as determined by the request type received from the second device, according to one or more embodiments.

The term IST device 110 is utilized to refer to the specific device that is transmitting an image stream with video images that are being viewed on the receiving second device 140. In the illustrative embodiments, IST device 110 is synonymous with communication device 110 presented within the preceding figures. It is appreciated, however, that the term IST device can be applied to any one of the devices that are communicatively coupled to a video presentation session 635 and transmits a video image, which is shared with other devices connected to the video communication session. Importantly, both IST device 110 and second device 140 are configured with program instructions to enable the unique functions described herein.

The processor determines whether the request type (communicated as an accessibility On/Off command/setting 630 from a corresponding second device 140) includes a first accessibility rating value that indicates that the interpreter (secondary subject 412) is to be included within the video feed or a second accessibility rating value that indicates that the interpreter is not to be included within the video feed. In response to the request type including the first accessibility rating value, the processor 202 transmits both the primary segment 440 with the main presenter (primary subject 410) and the secondary segment 445 with the interpreter within the video feed. However, in response to the request type including the second accessibility rating value, the processor 202 transmits only the primary segment 440 with the main presenter within the video feed.

Accordingly, depending on the receiving device setting within table 500 or the received accessibility rating or request for a particular subset of segments, the processor 202 selectively transmits, via the video presentation session 635 to each second device 140 with the first setting, a first video feed that comprises only the primary segment presenting only the primary subject. The processor 202 also transmits, via the video presentation session to each second device with the second setting, a second video feed comprising both the primary segment and at least one of the secondary segments, respectively presenting the primary subject and the secondary subject. In some implementations, this latter transmission may be a default transmission that avoids the processing by the AI engine if no second device requests the accessibility feature that presents the interpreter within the received video feed be turned off.

As shown by FIG. 6, the communication device, which operates as an image stream transmitting (IST) device 110, presents a preview of the primary segment 440 with primary subject 410 (i.e., main presenter) and a PIP inset of secondary subject 412. To support other features related to the separate control and modification of the primary segment via virtual inputs received as gestures, etc., the display also presents action centers with selectable features within virtual interfaces (located within respective left and right secondary segments 445A and 445B). These selectable features can be accessed by inputs received from a second device assigned host functionality (e.g., receiving second device 140a of participant identified via participant icon 622). Communication device provides video feed 645 to each receiving second device 140-140n that is connected to video presentation session 635 hosted on/by video communication application server 135. Each second device can be similarly configured as or support similar functionality as communication device 110 that enables second devices 140a-140n to present segments of a full video feed on local display.

In a first embodiment, the second device 104a-140n transmits its requested setting to the communication device 110, and the communication device 110 then selectively transmits specific segments of the full video feed to those second devices 140a-140n to include a single segment or multiple segments. The first example second device 140a, which is identified as participant 3, has host privileges (based on list 530 of FIG. 5). With this host privilege applied, the second device also receives action centers 610 with virtual user interfaces (not shown), which presents options such as background effect 612, which activates a background settings virtual interface (445) from which the background of the primary segment 440 can be modified, to apply a new background 620. Local accessibility settings option 625a is presented, enabling a local user to set (or toggle) the accessibility feature on or off. With the accessibility setting selection being off, as indicated by the shading presented in the off button, only the primary segment 440 with the primary subject 410 is presented to the local/remote participant on the remote device display. However, when the feature selection is on, as indicated by the shading presented in the "on" button within local accessibility settings option 625b of the other second device 140n, both the primary segment 440 with the primary subject 410 and the secondary segments with the secondary subjects 412 are presented to the remote participant on the remote device display (142n).

Figure 7:
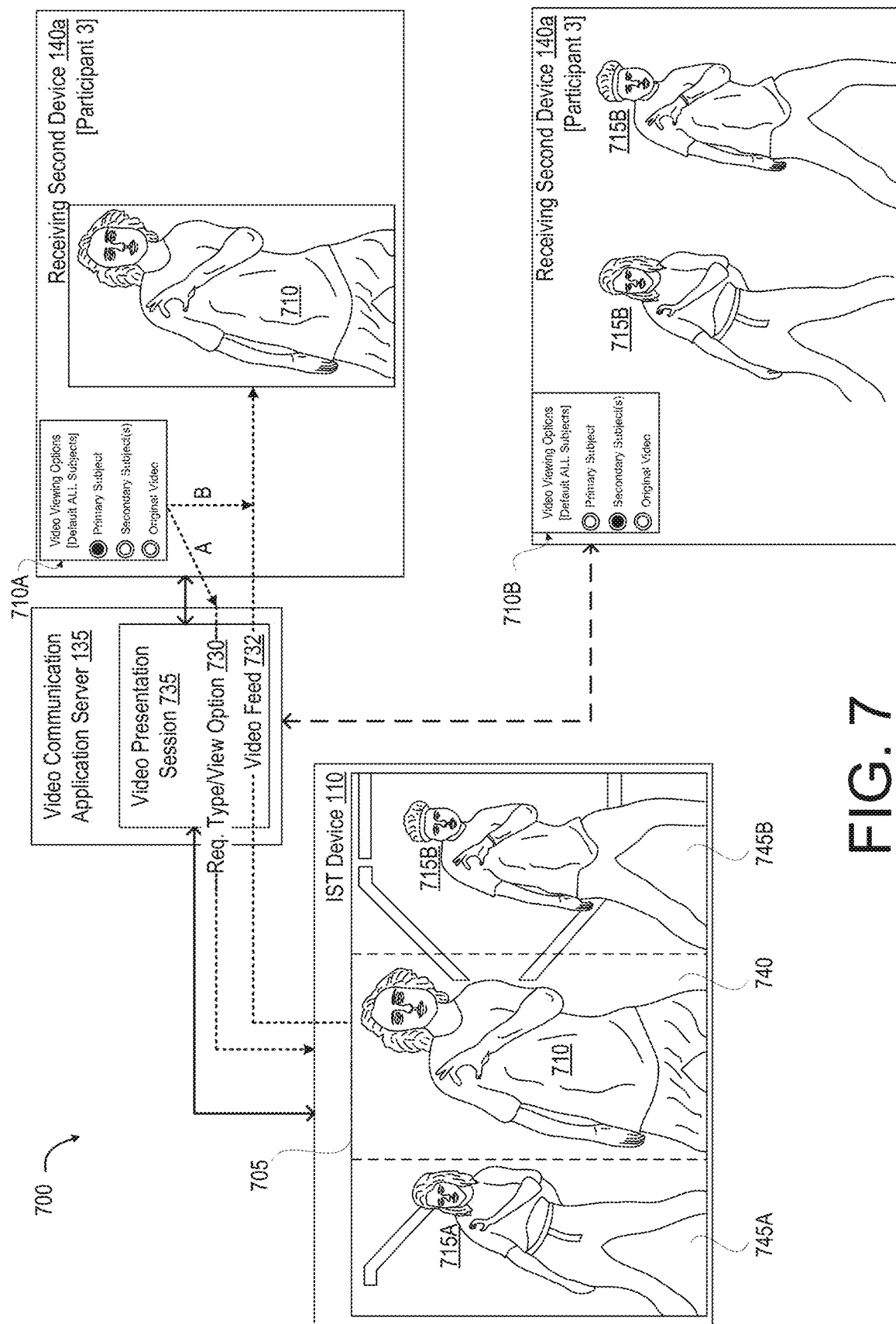
FIG. 7 illustrates another video presentation environment in which different segments of a video feed are locally presented on receiving second devices based on an accessibility setting of the receiving second device, according to one or more embodiments.

FIG. 7 illustrates another video presentation environment 700 in which different segments of a video feed 732 are locally presented on receiving second devices based on an accessibility setting of the receiving second device when the captured video stream 705 is provided multiple secondary segments that are not based on accessibility, according to one or more embodiments. With this specific embodiment, the captured video stream 705 includes a plurality of performers including a main performer and at least one secondary performer within a field of view of the image capturing device. The main performer is the primary subject 710 presented within the primary segment 740 and each of the at least one second performer is the secondary subject 715A-715B within respective ones of the at least one secondary segment 745. With this embodiment, the processor 202 determines whether a received request type includes (i) a first value indicating that the primary segment with the main performer and at least one second segment with a secondary performer are to be presented within the video feed or (ii) a second value indicating that only the main performer is to be presented within the video feed, or (iii) a third value indicating that only the secondary performer is to be presented within the video feed. In response to the request type including the first value, the processor transmits both the primary segment 740 with the main performer, who is the primary subject 710, and the at least one secondary segment 745A-745B with the secondary performer(s), who are the secondary subjects 715A-715B within the video feed 732. In response to the request type including the second value, the processor 202 transmits only the primary segment 740 with the primary subject 710 (i.e., the main performer) within the video feed. In response to the request type including the third value, the processor 202 transmits only one or more of the at last one secondary segment 745A, 745B, with a corresponding secondary subject 715A, 715B (e.g., second performers) within the video feed 732.

In the illustrative embodiment of FIG. 7, the at least one secondary segment comprises more than one secondary segment 745A, 745B, each secondary segment including a different secondary subject 715A, 715B. The at least one second performer include a second performer (715A) and a third performer (715B), each being a subject respectively of a second segment and a third segment. The processor performs granular selection of each different segment of the captured video stream for transmission to each of the plurality of second devices 140a-140n. Each second device 140a-140n can selectively request a primary segment, a second segment, a third segment, or additional available segments containing respective primary and secondary subjects to be transmitted within the video feed 732.

In an alternate embodiment, similar to FIG. 6, when second device 140 includes the functionality to locally perform the segmentation and selective presentation of video feed segments, the local AI engine (operating within the receiving second device (or the server)) receives the full segmented video feed from IST device 110 and then selectively presents the segment(s) indicated by the selected video viewing option 710A, 710B. Accordingly, in receiving second device 140a, only primary segment with main performer (primary subject 710) is presented. However, in receiving second device 140n, only the secondary segments 745A, 745B with the secondary performers (secondary subjects 715A, 715B) are presented.

FIGS. 6 and 7 also illustrates another aspect of the disclosure from the perspective of the receiving second electronic device 140a-140n. Similarly configured to communication device 110, in one embodiment, receiving second electronic device 140 includes a display device, a communication interface (e.g., WCS 242) that enables the electronic device 140 to communicatively connect to at least one image stream transmitting (IST) device 110 during a video presentation session 635/735, and a memory having stored thereon a video image segmentation and selection/presentation module (VISPM) with program instructions that triggers selective display of one or more segments of a received video feed, based on local user preferences. The second electronic device 140 includes at least one processor 202 communicatively coupled to the display device 142, the communication interface (WCS 242), and to the memory 220. The at least one processor 202 processes the program instructions of the VISPM, which configures the processor to receive, via the communication interface, the video feed from the video presentation session and determine that the video feed is a subject-based segmented video feed comprising multiple segments that can be individually selected for local presentation on the display device, including a primary segment 440 within which a primary subject is presented and at least one secondary segment 445 having at least one secondary subject. The at least one processor 202 determines a user preference for local viewing options of the video presentation session, from among (i) a first preference that the video feed should include respective segments presenting the primary subject and at least one secondary subject; and (ii) a second preference that the video feed should include only the primary segment with the primary subject; and (iii) a third preference that the video feed should include one or more of the at least one secondary segments, but not the primary segment. The at least one processor 202 provides a resulting video feed on the display device presenting only content of specific segments of the received video feed that correspond to the user preference.

In one or more embodiments, the processor 202 determines a user preference based on one or more of contextual evaluation, a history of previous viewing preferences, preset default user settings within a video communication application, and/or manual input via a settings option during the video presentation session 635/735. In one or more embodiments, the electronic device 140 includes at least one image capturing device that captures local video of subjects within a local scene, the at least one image capturing device communicatively coupled to the processor. The processor receives the local video, analyzes the local video for contextual information that can correlate to a user preference (for example, reciprocal use of hand gestures that correspond to sign language), and determines the user preference based on the contextual information.

According to one or more embodiments, the processor 202 further configures the second electronic device 140 to transmit the user preference to the IST device 110 as a specific request type 730 to trigger the IST device 110 to selectively transmit the video feed with specific segments based on the user preference. According, to transmit the user preference, the processor 202 generates a request type 730 that comprises one of a subset of segments within the video feed and a complete video feed, includes, within the request type for the subset of segments, an indication of which segments to include within the video feed, and transmits the request type 730 via the communication interface to one of the IST device 110 and a server (e.g., VCA server 135) processing segmented video feed requests for the video presentation session 735.

In the embodiments shown in FIG. 6, where the video feed includes a sign language interpreter accompanying a main presenter, the processor 202 determines a user preference for the video presentation session (e.g., by accessing local accessibility settings 625) and determines whether the user preference includes a first accessibility rating value that indicates that the interpreter is to be included within the video feed or a second accessibility rating value that indicates that the interpreter is not to be included within the video feed. In response to the user preference including the first accessibility rating value (e.g., "on" setting), the processor 202 locally presents on the display device 142 both the primary segment with the main presenter and the secondary segment with the interpreter within the displayed video feed (see second device 140*n*). However, in response to the user preference including the second accessibility rating value (e.g., "off" setting), the processor 202 locally presents on the display only the primary segment with the main presenter within the displayed video feed (see second device 140*a*).

In the embodiments shown in FIG. 7, where the video feed includes a plurality of performers including a main performer and at least one secondary performer, the main performer is the primary subject presented within the primary segment and each of the at least one second performer is the secondary subject within respective ones of the at least one secondary segment.

The processor 202 determines a user preference and determines whether the user preference includes (i) a first preference indicating that the primary segment with the main performer and at least one second segment with a secondary performer are to be presented within the video feed or (ii) a second preference indicating that only the main performer is to be presented within the video feed, or (iii) a third preference indicating that only the secondary performer(s) is to be presented within the video feed. In response to the user preference being the first preference, the processor 202 locally presents on the display both the primary segment with the main performer and the at least one secondary segment with the secondary performer within the video feed. In response to the user preference being the second preference, the processor 202 locally presents on the display only the primary segment with the first performer within the video feed. In response to the user preference being the third preference, the processor 202 locally presents on the display only one or more of the at least one secondary segment with a corresponding secondary performer within the video feed.

In the embodiments in which the at least one secondary segment includes more than one secondary segment, each including a different secondary subject, the processor 202 performs granular selection of each different segment of the captured video stream for presenting on the display of the electronic device. For example, in FIG. 7, the at least one second performer includes a second performer and a third performer, each being a subject respectively of a second segment and a third segment. The processor 202 selectively requests and presents one or more of a primary segment, a second segment, a third segment, or additional available segments containing respective subjects that can be transmitted within the video feed.

Figure 8:
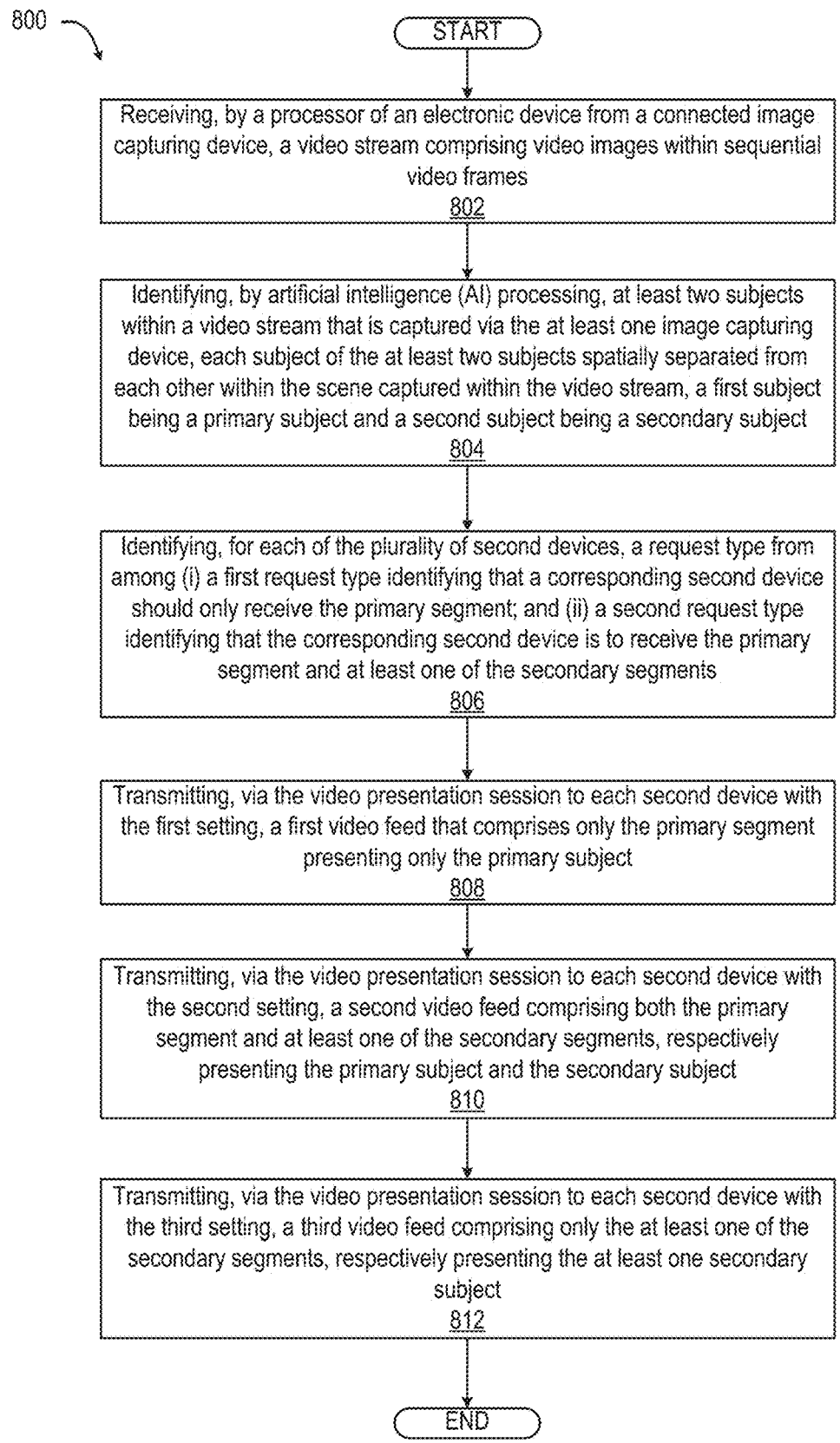
FIG. 8 depicts a flowchart of a method by which a communication device performs segmenting of a locally captured video, based on detecting people subjects, and selectively transmits segments of the video within a video feed to a second device during a video presentation session, according to one or more embodiments.
Figure 9:
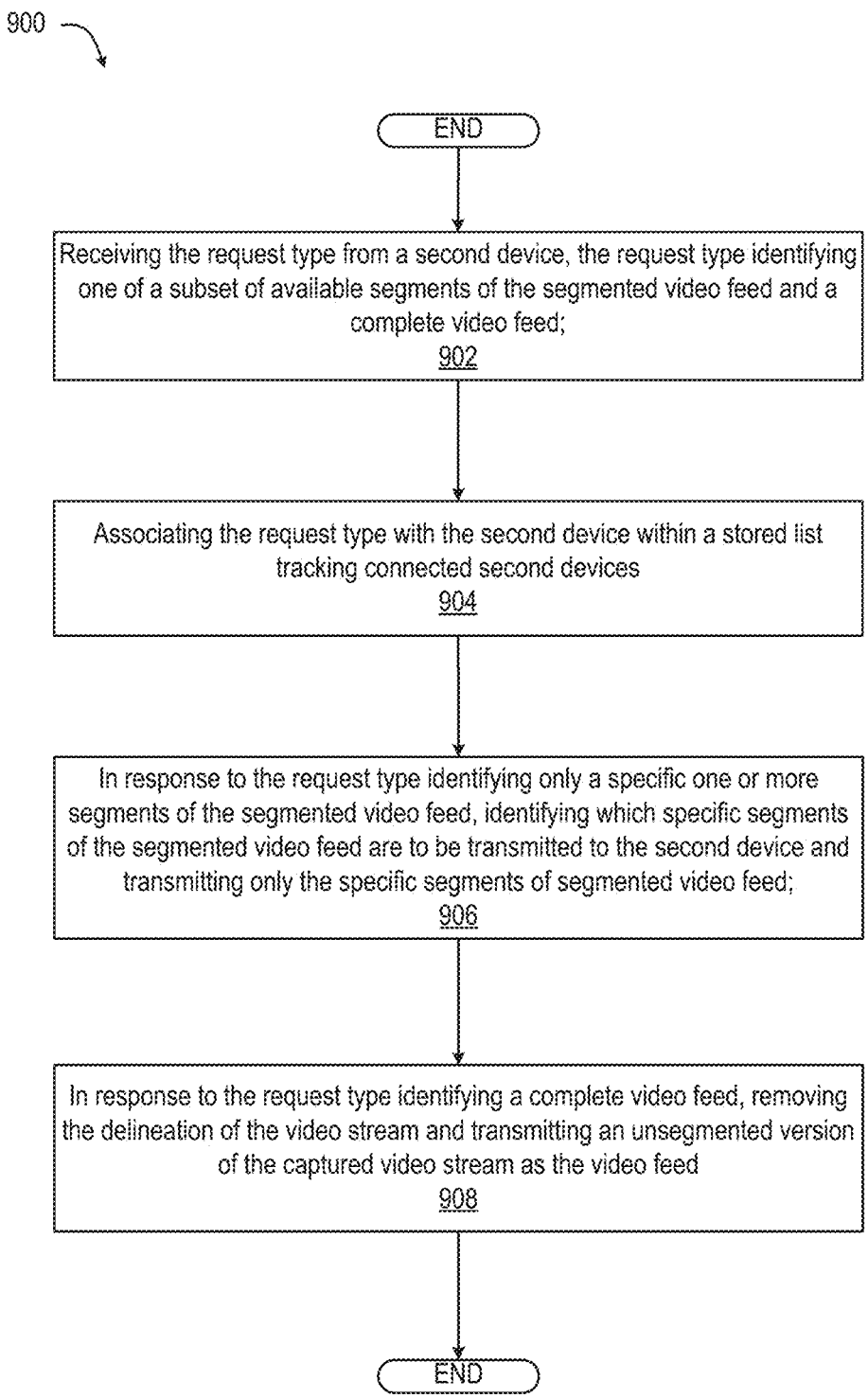
FIG. 9 depicts a flowchart of a method by which a communication device identifies which segments of a video feed to generate and transmit to a second device, based on a request type received from the second device, according to one or more embodiments.

FIG. 8 depicts a flowchart of a method 800 by which a communication device performs segmenting of a locally captured video, based on detecting subjects, and selectively transmits segments of the video within a video feed to a second device during a video presentation session, according to one or more embodiments. FIG. 9 depicts a flowchart of a method 900 by which a communication device identifies which segments of a video feed to generate and transmit to a second device, based on a request type received from the second device, according to one or more embodiments. FIG.

Figure 11:
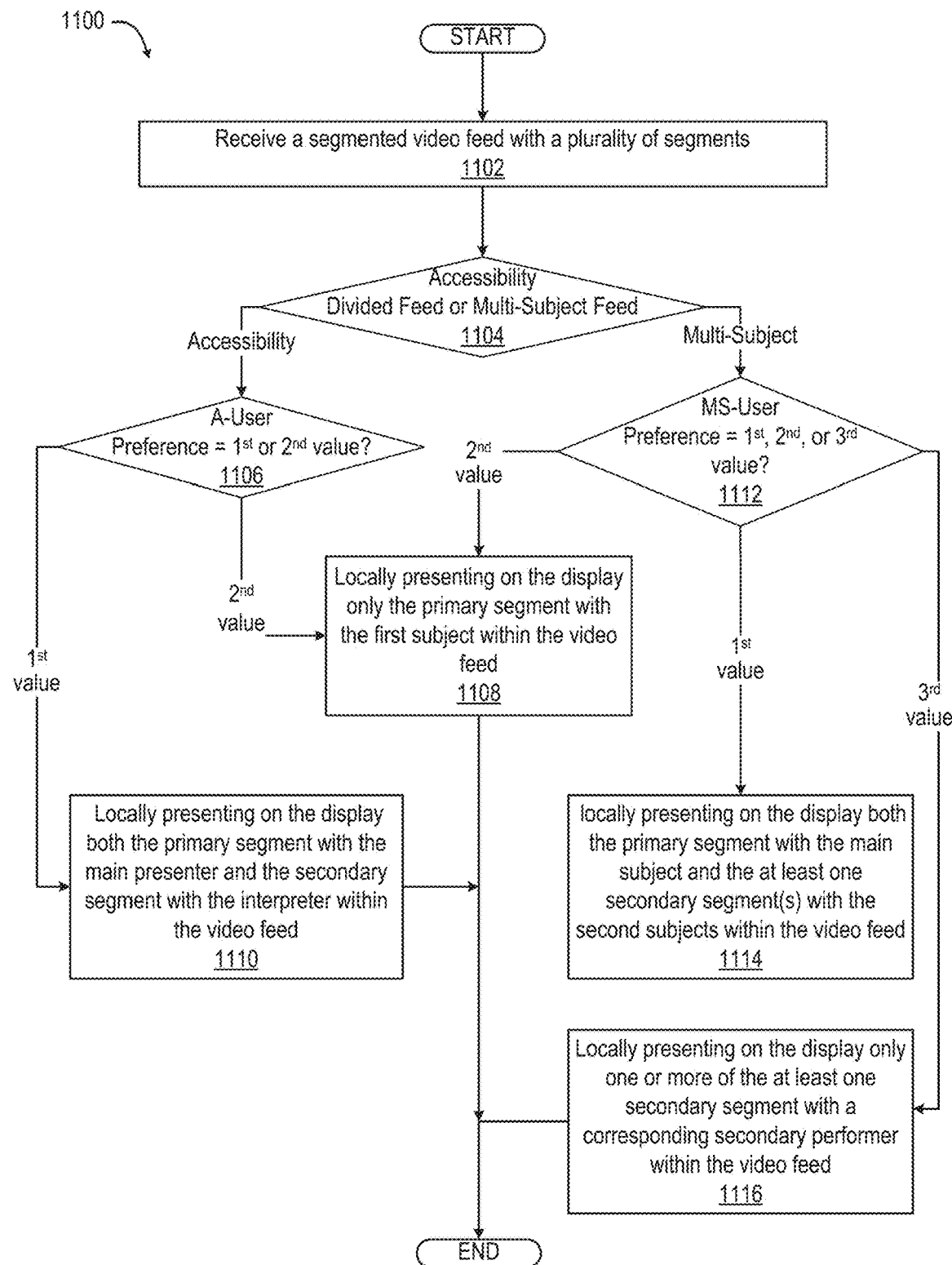
FIG. 11 depicts a flowchart of a method by which the receiving second device selectively presents one or more of multiple segments within a received segmented video feed on a local display, based on one of an accessibility setting and a subject presentation setting, according to one or more embodiments, according to multiple different embodiments.

10 depicts a flowchart of a method 1000 by which a receiving second device selects which of multiple segments available within a received segmented video feed is presented on a local display, based on one of an accessibility setting and a subject presentation setting, according to one or more embodiments. FIG. 11 depicts a flowchart of a method 1100 by which the receiving second device selectively presents one or more of multiple segments within a received segmented video feed on a local display, based on one of an accessibility setting and a subject presentation setting, according to one or more embodiments, according to multiple different embodiments.

The descriptions of the various methods presented herein are provided with general reference to the specific components illustrated within the preceding figures. Specific components referenced in methods 800, 900, 1000, 1100 may be identical or similar to components of the same name used in describing the preceding figures. In one or more embodiments, the features of method 1000 and the other methods described herein can be provided by processor 202 of communication device 110 operating on program instructions from the various modules and applications presented in FIGS. 2A-2B. It is appreciated that certain of the described features of methods 800, 900, 1000 may be completed by AI engine 205, ICD controller 234, GPU 203c, etc., and these features are all generally described as being performed by processor 202 for simplicity.

With reference to FIG. 8, method 800 includes receiving, by a processor 202 of an electronic device 110 from a connected ICD 232/233, a video stream comprising video images within sequential video frames (block 802). Method 800 includes identifying, by artificial intelligence (AI) processing, at least two subjects within a video stream that is captured via the at least one image capturing device, each subject of the at least two subjects spatially separated from each other within the scene captured within the video stream, a first subject being a primary subject 410 and a second subject being a secondary subject 412 (block 804). Method 800 includes delineating the scene captured in the video stream into a plurality of segments, based on respective locations of the primary subject and the secondary subject, including a primary segment that encompasses the primary subject and at least one secondary segment that encompasses a respective secondary subject (block 806). Method 800 includes identifying, for each of the plurality of second devices, a request type from among (i) a first request type identifying that a corresponding second device should only receive the primary segment; and (ii) a second request type identifying that the corresponding second device is to receive the primary segment and at least one of the secondary segments; and (iii) a third request type identifying that the corresponding second device is to receive one or more of the at least one secondary segments, but not the primary segment (block 808). Method 800 includes transmitting, via the video presentation session to each second device with the first setting, a first video feed that comprises only the primary segment presenting only the primary subject (block 808). Method 800 includes transmitting, via the video presentation session to each second device with the second setting, a second video feed comprising both the primary segment and at least one of the secondary segments, respectively presenting the primary subject and the secondary subject (block 810). Method 800 further includes transmitting, via the video presentation session to each second device with the third setting, a third video feed comprising only the at least one of the secondary segments, respectively presenting the at least one secondary subject (block 812). Method 800 then ends.

Referring to FIG. 9, method 900 includes receiving the request type from a second device, the request type identifying one of a subset of available segments of the segmented video feed and a complete video feed (block 902). Method 900 includes associating the request type with the second device within a stored list tracking connected second devices (block 904). Method 900 includes, in response to the request type identifying only a specific one or more segments of the segmented video feed, identifying which specific segments of the segmented video feed are to be transmitted to the second device and transmitting only the specific segments of segmented video feed (block 906). Method 900 includes in response to the request type identifying a complete video feed, removing the delineation of the video stream and transmitting an unsegmented version of the captured video stream as the video feed (block 908). Method 900 then ends.

Figure 10:
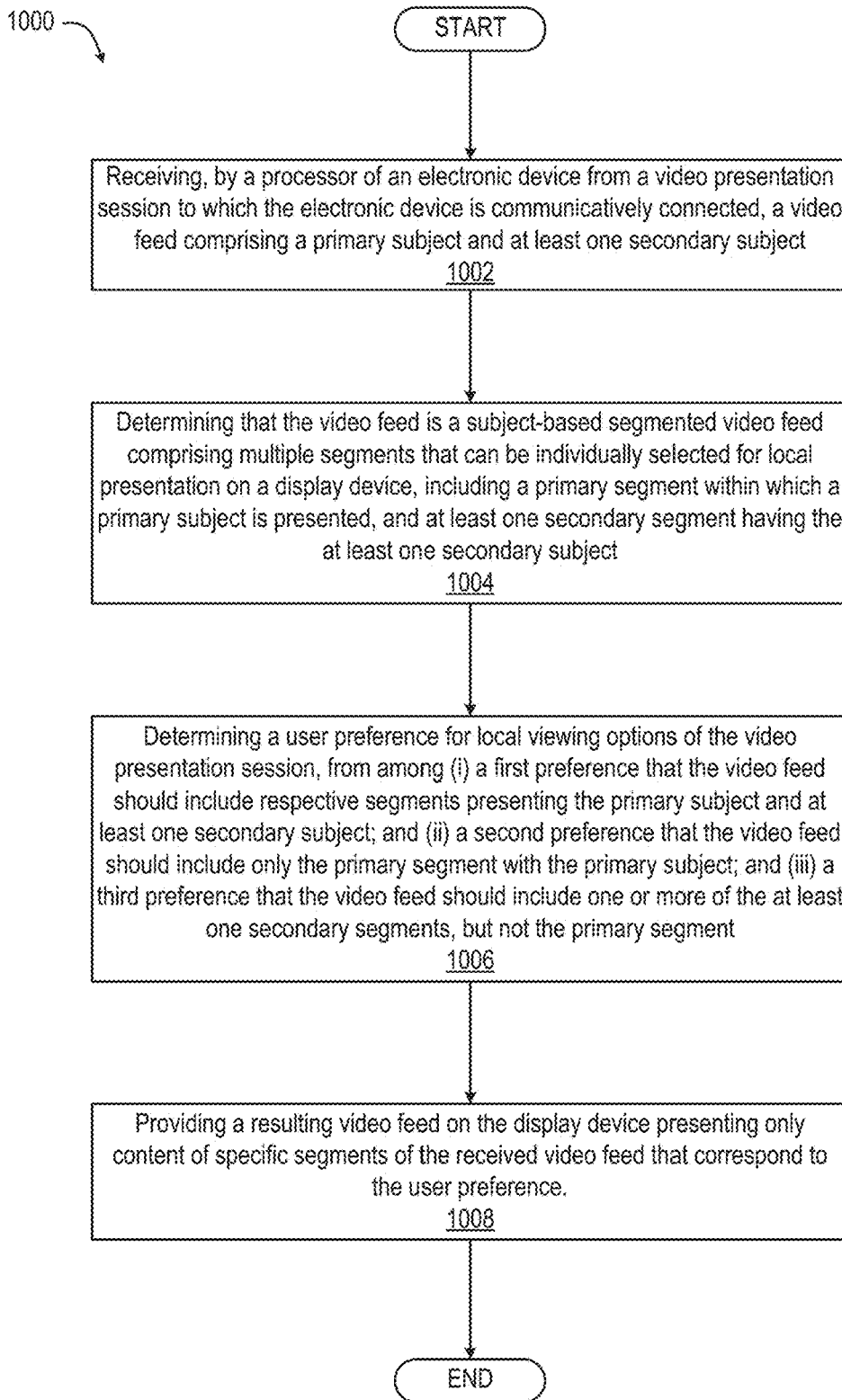
FIG. 10 depicts a flowchart of a method by which a receiving second device selects which of multiple segments available within a received segmented video feed is presented on a local display, based on one of an accessibility setting and a subject presentation setting, according to one or more embodiments.

With reference now to FIG. 10, method 1000 includes receiving, by a processor 202 of an electronic device 140 from a video presentation session (635/735) to which the electronic device is communicatively connected, a video feed (645/732) including a primary subject and at least one secondary subject (block 1002). Method 1000 includes determining that the video feed is a subject-based segmented video feed having multiple segments that can be individually selected for local presentation on a display device, including a primary segment within which a primary subject is presented, and at least one secondary segment having the at least one secondary subject (block 1004). Method 1000 includes determining a user preference for local viewing options of the video presentation session, from among (i) a first preference that the video feed should include respective segments presenting the primary subject and at least one secondary subject; and (ii) a second preference that the video feed should include only the primary segment with the primary subject; and (iii) a third preference that the video feed should include one or more of the at least one secondary segments, but not the primary segment (block 1006). According to one embodiment, determining the user preference further includes generating from the user preference a request type that corresponds to one of a subset of segments within the video feed and a complete video feed, including within the request type for the subset of segments an indication of which segments to include within the video feed, and transmitting the request type via the communication interface to one of an image stream transmitting (IST) device and a server processing segmented video feed requests for the video presentation session, to trigger the IST device or server to selectively transmit the video feed with specific segments based on the user preference. Method 1000 includes providing a resulting video feed on the display device presenting only content of specific segments of the received video feed that correspond to the user preference (block 1008). Method 1000 then ends.

With reference to FIG. 11, method 1100 includes receiving, at the second device 140, a segmented video feed with a plurality of delineated segments (block 1102). Method 1100 includes determining whether the received video feed include an accessibility type segmented video feed (e.g., including a main presenter as the primary subject within the primary segment and a sign language interpreter as the secondary subject within the secondary segment) or a multi-subject video feed (e.g., including a plurality of performers including a main performer and at least one secondary performer as the primary subject within a primary segment the secondary subject(s) within respective secondary segment(s)) (decision block 1104). In response to the received video feed including a accessibility type segmented video feed, method 1100 includes determining a user preference for the video presentation session and determining whether the user preference includes a first accessibility rating value that indicates that the interpreter is to be included within the video feed or a second accessibility rating value that indicates that the interpreter is not to be included within the video feed (block 1106). Method 1100 further includes in response to the user preference including the second accessibility rating value, locally presenting on the display only the primary segment with the main presenter within the video feed (block 1108). Method 1100 further includes, in response to the user preference including the first accessibility rating value, locally presenting on the display both the primary segment with the main presenter and the secondary segment with the interpreter within the video feed (block 1110).

Returning to decision block 1104, in response to the video feed being a multi-subject video feed, method 1100 includes determining a user preference from among (i) a first preference indicating that the primary segment with the main performer and at least one second segment with a secondary performer are to be presented within the video feed or (ii) a second preference indicating that only the main performer is to be presented within the video feed, or (iii) a third preference indicating that only the secondary performer is to be presented within the video feed (block 1112). Method 1100 includes in response to the user preference being the first preference, locally presenting on the display both the primary segment with the main performer and the at least one secondary segment with the secondary performer within the video feed (block 1114). Method 1100 incudes, in response to the user preference being the second preference, locally presenting on the display only the primary segment with the first performer within the video feed (block 1108). Method 1100 includes in response to the user preference being the third preference, locally presenting on the display only one or more of the at least one secondary segment with a corresponding secondary performer within the video feed (block 1116). Method 1100 then ends.

In embodiments in which the at least one secondary segment includes more than one secondary segment with each secondary segment including a different secondary subject, method 1100 can include performing granular selection of each different segment of the captured video stream for presenting on the display of the electronic device. Accordingly, the electronic device selectively requests and presents one or more of a primary segment, a second segment, a third segment, or additional available segments containing respective subjects that can be transmitted within the video feed.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
   at least one image capturing device that captures video images of a scene;
   an interface by which the electronic device connects to a display device;
   a communication interface that enables the electronic device to communicatively connect and transmit a video feed to a plurality of second devices during a video presentation session;
   a memory having stored thereon a subject-based video image segmentation and presentation module (S-VISPM) comprising program instructions for spatially delineating video images of a captured video into two or more segments that can be individually presented within or removed from the video feed being transmitted via the video presentation session; and
   at least one processor communicatively coupled to the display device, to the communication interface, to each of the at least one image capturing device, and to the memory, the at least one processor executing the program instructions of the S-VISPM, which configures the processor to:
   identify at least two subjects within a single video stream of the scene that is captured via the at least one image capturing device, each subject of the at least two subjects spatially separated from each other within the scene captured within the video stream, a first subject being a primary subject and a second subject being a secondary subject;
   delineate and segment the scene captured in the single video stream into a plurality of segments, based on respective locations of the primary subject and the secondary subject within the scene, including a primary segment that encompasses the primary subject and at least one secondary segment that encompasses a respective secondary subject;
   identify, for each of the plurality of second devices, a request type from among (i) a first request type identifying that a corresponding second device should only receive the primary segment of the single video stream; (ii) a second request type identifying that the corresponding second device is to receive the primary segment and at least one of the secondary segments; and (iii) a third request type identifying that the corresponding second device is to receive one or more of the at least one secondary segments, but not the primary segment;
   transmit, via the video presentation session to each second device with the first request type, a first video feed that comprises only the primary segment presenting only the primary subject;
   transmit, via the video presentation session to each second device with the second request type, a second video feed comprising both the primary segment and at least one of the secondary segments, respectively presenting the primary subject and the secondary subject; and
   transmit, via the video presentation session to each second device with the third request type, a third video feed comprising only the at least one of the secondary segments, respectively presenting the at least one secondary subject.

2. The electronic device of claim 1, wherein the processor:
   identifies the primary subject based on contextual data evaluated by artificial intelligence (AI) processing;
   determines a location of the primary subject within the scene; and
   determines, using the AI processing, the primary segment based on the location of the primary subject.

3. The electronic device of claim 1, wherein the processor:
   delineates at least one periphery segment of the captured video image that does not contain a subject of interest;
   links a virtual control interface window (VCIW) with a location of one or more of the at least one second segment, the VCIW comprising at least one feature that can be selected via one of air gestures and screen touches during presentation of the video feed to modify a setting of content within the video feed;
   overlays the at least one periphery segment with the VCIW, which supports selection via at least one of a touch input and a gesture input; and
   presents a preview of the capture video image with the VCIW presented within the preview on the display device.

4. The electronic device of claim 1, wherein the processor:
   receives the request type from a second device, the request type identifying one of a subset of available segments of the segmented video feed and a complete video feed;
   associates the request type with the second device within a stored list tracking connected second devices;
   in response to the request type identifying only a specific one or more segments of the segmented video feed, identifies which specific segments of segmented video feed are to be transmitted to the second device and transmits only the specific segments of the segmented video feed; and
   in response to the request type identifying a complete video feed, removes the delineation of the video stream and transmits an unsegmented version of the captured video stream as the video feed.

5. The electronic device of claim 1, wherein:
the captured video stream includes a sign language interpreter accompanying a main presenter;
the main presenter is the primary subject within the primary segment and the interpreter is the secondary subject within the secondary segment; and
the processor:
  receives a request type from a second device that receives the video feed via the video presentation session;
  determines whether the request type includes a first accessibility rating value that indicates that the interpreter is to be included within the video feed or a second accessibility rating value that indicates that the interpreter is not to be included within the video feed;
  in response to the request type including the first accessibility rating value, transmits both the primary segment with the main presenter and the secondary segment with the interpreter within the video feed; and
  in response to the request type including the second accessibility rating value, transmits only the primary segment with the main presenter within the video feed.

6. The electronic device of claim 1, wherein:
the captured video stream includes a plurality of performers including a main performer and at least one secondary performer within a field of view of the image capturing device;
the main performer is the primary subject presented within the primary segment and each of the at least one secondary performer is the secondary subject within respective ones of the at least one secondary segment; and
the processor:
  determines whether the request type includes (i) a first value indicating that the primary segment with the main performer and at least one second segment with a secondary performer are to be presented within the video feed or (ii) a second value indicating that only the main performer is to be presented within the video feed, or (iii) a third value indicating that only the secondary performer is to be presented within the video feed;
  in response to the request type including the first value, transmits both the primary segment with the main performer and the at least one secondary segment with the secondary performer within the video feed;
  in response to the request type including the second value, transmits only the primary segment with the first performer within the video feed; and
  in response to the request type including the third value, transmits only one or more of the at last one secondary segment with a corresponding secondary performer within the video feed.

7. The electronic device of claim 6, wherein:
the at least one secondary segment comprises more than one secondary segment and each secondary segment includes a different secondary subject;
the at least one second performer comprises a second performer and a third performer, each being a subject respectively of a second segment and a third segment; and
the processor performs granular selection of each different segment of the captured video stream for transmission to each of the plurality of second devices, wherein each second device can selectively request a primary segment, a second segment, a third segment, or additional available segments containing respective subjects to be transmitted within the video feed.

8. A method comprising:
receiving, by a processor of an electronic device from a connected image capturing device, a single video stream of a scene, the single video stream comprising video images within sequential video frames;
identifying, by artificial intelligence (AI) processing, at least two subjects within the video stream of the scene that is captured via the at least one image capturing device, each subject of the at least two subjects spatially separated from each other within the scene captured within the video stream, a first subject being a primary subject and a second subject being a secondary subject;
delineating and segmenting the scene captured in the video stream into a plurality of segments, based on respective locations of the primary subject and the secondary subject within the scene, including a primary segment that encompasses the primary subject and at least one secondary segment that encompasses a respective secondary subject;
identifying, for each of the plurality of second devices, a request type from among (i) a first request type identifying that a corresponding second device should only receive the primary segment from the single video stream of the scene; (ii) a second request type identifying that the corresponding second device is to receive the primary segment and at least one of the secondary segments; and (iii) a third request type identifying that the corresponding second device is to receive one or more of the at least one secondary segments, but not the primary segment;
transmitting, via a video presentation session to each second device with the first request type, a first video feed that comprises only the primary segment presenting only the primary subject;
transmitting, via the video presentation session to each second device with the second request type, a second video feed comprising both the primary segment and at least one of the secondary segments, respectively presenting the primary subject and the secondary subject; and
transmitting, via the video presentation session to each second device with the third request type, a third video feed comprising only the at least one of the secondary segments, respectively presenting the at least one secondary subject.

9. The method of claim 8, further comprising:
identifying the primary subject based on contextual data evaluated by artificial intelligence (AI) processing;
determining a location of the primary subject within the scene; and
determining, using the AI processing, the primary segment based on the location of the primary subject.

10. The method of claim 8, further comprising:
delineating at least one periphery segment of the captured video image that does not contain a subject of interest;
linking a virtual control interface window (VCIW) with a location of one or more of the at least one second segment, the VCIW comprising at least one feature that can be selected via one of air gestures and screen touches during presentation of the video feed to modify a setting of content within the video feed;

overlaying the at least one periphery segment with the VCIW, which supports selection via at least one of a touch input and a gesture input; and presenting a preview of the capture video image with the VCIW presented within the preview on a display device.

11. The method of claim 8, further comprising:

receiving the request type from a second device, the request type identifying one of a subset of available segments of the segmented video feed and a complete video feed;

associating the request type with the second device within a stored list tracking connected second devices;

in response to the request type identifying only a specific one or more segments of the segmented video feed, identifying which specific segments of the segmented video feed are to be transmitted to the second device and transmitting only the specific segments of segmented video feed; and in response to the request type identifying a complete video feed, removing the delineation of the video stream and transmitting an unsegmented version of the captured video stream as the video feed.

12. The method of claim 8, wherein:

the captured video stream includes a sign language interpreter accompanying a main presenter;

the main presenter is the primary subject within the primary segment and the interpreter is the secondary subject within the secondary segment; and the method comprises:

receiving a request type from a second device that receives the video feed via the video presentation session;

determining whether the request type includes a first accessibility rating value that indicates that the interpreter is to be included within the video feed or a second accessibility rating value that indicates that the interpreter is not to be included within the video feed;

in response to the request type including the first accessibility rating value, transmitting both the primary segment with the main presenter and the secondary segment with the interpreter within the video feed; and in response to the request type including the second accessibility rating value, transmitting only the primary segment with the main presenter within the video feed.

13. The method of claim 8, wherein:

the captured video stream includes a plurality of performers including a main performer and at least one secondary performer within a field of view of the image capturing device;

the main performer is the primary subject presented within the primary segment and the at least one secondary performer is the secondary subject within respective ones of the at least one secondary segment; and the method comprises:

determining whether the request type includes (i) a first value indicating that the primary segment with the main performer and at least one second segment with a secondary performer are to be presented within the video feed or (ii) a second value indicating that only the main performer is to be presented within the video feed, or (iii) a third value indicating that only the secondary performer is to be presented within the video feed;

in response to the request type including the first value, transmitting both the first segment with the main performer and the at least one second segment with the secondary performer within the video feed;

in response to the request type including the second value, transmitting only the first segment with the first performer within the video feed; and in response to the request type including the third value, transmitting only one or more of the at last one secondary segment with a corresponding secondary performer within the video feed.

14. The method of claim 13, wherein:

the at least one second performer comprises a second performer and a third performer, each being a subject respectively of a second segment and a third segment; and the method comprises performing granular selection of each different segment of the captured video stream for transmission to each of the plurality of second devices, wherein each second device can selectively request a primary segment, a second segment, a third segment, or additional available segments containing respective subjects to be transmitted within the video feed.

15. A computer program product comprising a non-transitory computer readable medium having program instructions that when executed by a processor of an electronic device connected to a display device enables the electronic device to perform functions comprising:

receiving, by the processor from a connected image capturing device, a single video stream of a scene, the single video stream comprising video images within sequential video frames;

identifying, by artificial intelligence (AI) processing, at least two subjects within the video stream of the scene that is captured via the at least one image capturing device, each subject of the at least two subjects spatially separated from each other within the scene captured within the video stream, a first subject being a primary subject and a second subject being a secondary subject;

delineating and segmenting the scene captured in the video stream into a plurality of segments, based on respective locations of the primary subject and the secondary subject within the scene, including a primary segment that encompasses the primary subject and at least one secondary segment that encompasses a respective secondary subject;

identifying, for each of the plurality of second devices, a request type from among (i) a first request type identifying that a corresponding second device should only receive the primary segment from the single video stream of the scene; (ii) a second request type identifying that the corresponding second device is to receive the primary segment and at least one of the secondary segments; and (iii) a third request type identifying that the corresponding second device is to receive one or more of the at least one secondary segments, but not the primary segment;

transmitting, via a video presentation session to each second device with the first request type, a first video feed that comprises only the primary segment presenting only the primary subject;

transmitting, via the video presentation session to each second device with the second request type, a second video feed comprising both the primary segment and at least one of the secondary segments, respectively presenting the primary subject and the secondary subject; and transmitting, via the video presentation session to each second device with the third request type, a third video feed comprising only the at least one of the secondary segments, respectively presenting the at least one secondary subject.

16. The computer program product of claim 15, wherein the program instructions further enable the processor to perform the functions of:
identifying the primary subject based on contextual data evaluated by artificial intelligence (AI) processing;
determining a location of the primary subject within the scene; and
determining, using the AI processing, the primary segment based on the location of the primary subject.

17. The computer program product of claim 15, wherein the program instructions further enable the processor to perform the functions of:
delineating at least one periphery segment of the captured video image that does not contain a subject of interest;
linking a virtual control interface window (VCIW) with a location of one or more of the at least one second segment, the VCIW comprising at least one feature that can be selected via one of air gestures and screen touches during presentation of the video feed to modify a setting of content within the video feed;
overlaying the at least one periphery segment with the VCIW, which supports selection via at least one of a touch input and a gesture input; and
presenting a preview of the capture video image with the VCIW presented within the preview on the display device.

18. The computer program product of claim 15, wherein the program instructions further enable the processor to perform the functions of:
receiving the request type from a second device, the request type identifying one of a subset of available segments of the segmented video feed and a complete video feed;
associating the request type with the second device within a stored list tracking connected second devices;
in response to the request type identifying only a specific one or more segments of the segmented video feed, identifying which specific segments of the segmented video feed are to be transmitted to the second device and transmitting only the specific segments of segmented video feeds; and
in response to the request type identifying a complete video feed, removing the delineation of the video stream and transmitting an unsegmented version of the captured video stream as the video feed.

19. The computer program product of claim 15, wherein: the captured video stream includes a sign language interpreter accompanying a main presenter;

the main presenter is the primary subject within the primary segment and the interpreter is the secondary subject within the secondary segment; and the program instructions further enable the processor to perform the functions of:
receiving a request type from a second device that receives the video feed via the video presentation session;
determining whether the request type includes a first accessibility rating value that indicates that the interpreter is to be included within the video feed or a second accessibility rating value that indicates that the interpreter is not to be included within the video feed;
in response to the request type including the first accessibility rating value, transmitting both the primary segment with the main presenter and the secondary segment with the interpreter within the video feed; and
in response to the request type including the second accessibility rating value, transmitting only the primary segment with the main presenter within the video feed.

20. The computer program product of claim 15, wherein:
the captured video stream includes a plurality of performers including a main performer and at least one secondary performer within a field of view of the image capturing device;
the main performer is the primary subject presented within the primary segment and the at least one second performer is the secondary subject within respective ones of the at least one secondary segment; and
the program instructions further enable the processor to perform the functions of:
determining whether the request type includes (i) a first value indicating that the primary segment with the main performer and at least one second segment with a secondary performer are to be presented within the video feed or (ii) a second value indicating that only the main performer is to be presented within the video feed, or (iii) a third value indicating that only the secondary performer is to be presented within the video feed;
in response to the request type including the first value, transmitting both the first segment with the main performer and the at least one second segment with the secondary performer within the video feed;
in response to the request type including the second value, transmitting only the first segment with the first performer within the video feed; and
in response to the request type including the third value, transmitting only one or more of the at last one secondary segment with a corresponding secondary performer within the video feed.

* * * * *